United States Patent
Nory et al.

(10) Patent No.: US 10,051,617 B2
(45) Date of Patent: *Aug. 14, 2018

(54) METHOD AND APPARATUS FOR SCHEDULING USER EQUIPMENT UPLINK TRANSMISSIONS ON AN UNLICENSED CARRIER

(71) Applicant: MOTOROLA MOBILITY LLC, Chicago, IL (US)

(72) Inventors: Ravikiran Nory, Buffalo Grove, IL (US); Vijay Nangia, Algonquin, IL (US); Murali Narasimha, Vernon Hills, IL (US); Ajit Nimbalker, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/751,171

(22) Filed: Jun. 26, 2015

(65) Prior Publication Data
US 2016/0278048 A1  Sep. 22, 2016

Related U.S. Application Data

(60) Provisional application No. 62/134,278, filed on Mar. 17, 2015.

(51) Int. Cl.
*H04W 72/04* (2009.01)
*H04W 16/14* (2009.01)
(Continued)

(52) U.S. Cl.
CPC ......... *H04W 72/042* (2013.01); *H04L 1/1812* (2013.01); *H04L 5/0044* (2013.01);
(Continued)

(58) Field of Classification Search
USPC ................................. 370/329–330
See application file for complete search history.

(56) References Cited

U.S. PATENT DOCUMENTS

| 7,778,151 B2 | 8/2010 | Bertrand |
| 8,761,195 B2 | 6/2014 | Tiirola |
| (Continued) | | |

FOREIGN PATENT DOCUMENTS

EP     2204937 A1    7/2010

OTHER PUBLICATIONS

Qualcomm Incorporated: "Solutions for required functionalities and design targets", 3GPP TSG RAN WG1 #78bis, R1-144000, Oct. 6-10, 2014, Ljubljama, Slovenia, all pages.
(Continued)

*Primary Examiner* — Candal Elpenord
(74) *Attorney, Agent, or Firm* — Matthew C. Loppnow; The Watson I.P. Group, PLC

(57) ABSTRACT

A method and apparatus schedule user equipment uplink transmissions on an unlicensed carrier. A configuration indicating a window length can be received from a higher layer, where the higher layer can be higher than a physical layer. A grant can be received in a subframe, where the grant can be for transmitting a physical uplink shared channel on a serving cell operating on an unlicensed carrier. A set of subframes for possible transmission of the physical uplink shared channel can be determined based on the window length and the subframe in which the grant is received. Listen before talk can be performed on the unlicensed carrier to determine an earliest unoccupied subframe in the set of subframes. The physical uplink shared channel can be transmitted in the earliest unoccupied subframe in response to receiving the grant.

18 Claims, 10 Drawing Sheets

(51) Int. Cl.
*H04L 1/18* (2006.01)
*H04L 5/00* (2006.01)
*H04L 27/00* (2006.01)

(52) U.S. Cl.
CPC ......... *H04L 27/0006* (2013.01); *H04W 16/14* (2013.01); *H04L 5/0051* (2013.01); *H04L 5/0057* (2013.01); *H04L 5/0091* (2013.01); *H04W 72/0446* (2013.01)

(56) References Cited

U.S. PATENT DOCUMENTS

| | | | |
|---|---|---|---|
| 2008/0080472 | A1 | 4/2008 | Bertrand et al. |
| 2008/0298477 | A1 | 12/2008 | Classon |
| 2009/0181687 | A1 | 7/2009 | Tiirola |
| 2011/0205981 | A1 | 8/2011 | Koo |
| 2012/0113831 | A1 | 5/2012 | Pelletier |
| 2013/0315152 | A1* | 11/2013 | Ratasuk .............. H04W 76/023 370/329 |
| 2013/0322376 | A1 | 12/2013 | Marinier |
| 2014/0269338 | A1 | 9/2014 | Jung |
| 2015/0055589 | A1 | 2/2015 | Yerramalli |
| 2015/0085797 | A1* | 3/2015 | Ji ............................ H04J 3/16 370/329 |
| 2015/0296384 | A1 | 10/2015 | Sadek |
| 2016/0050667 | A1 | 2/2016 | Papasakellariou |
| 2016/0095134 | A1* | 3/2016 | Chen ................ H04W 72/1268 370/336 |
| 2016/0227476 | A1* | 8/2016 | Yerramalli ........... H04L 5/0048 |
| 2016/0233989 | A1* | 8/2016 | Belghoul ............. H04L 1/1887 |
| 2016/0278048 | A1 | 9/2016 | Nory |
| 2016/0278049 | A1 | 9/2016 | Nory |
| 2016/0301509 | A1 | 10/2016 | Narasimha |

OTHER PUBLICATIONS

Nokia Networks, Nokia Corporation: "On Listen Before Talk and Channel Access", 3GPP TSG RAN WG1 Meeting #79, R1-145003, San Francisco, USA, Nov. 17-21, 2014, all pages.
LG Electronics, DL/UL solutions of LAA with LBT, R1-150214, 3GPP TSG RAN WG1 Meeting #80, Athens, Greece, Feb. 9-13, 2015.
ZTE, Analysis on potential issues and solutions for LAA UL transmission, R1-150156, 3GPP TSG RAN WG1 Meeting #80, Athens, Greece, Feb. 9-13, 2015.
NTT Docomo, Views on issues related to LAA UL, R1-144970, 3GPP TSG RAN WG1 Meeting #79, San Francisco, USA, Nov. 17-21, 2014.
ZTE, HARQ related issues for Licensed-assisted access using LTE, R1-144829, 3GPP TSG RAN WG1 Meeting #79, San Francisco, USA, Nov. 17-21, 2014.
ZTE, Analysis of LAA UL enhancement, R1-144830, 3GPP TSG RAN WG1 Meeting #79, San Francisco, USA, Nov. 17-21, 2014.
Skraparlis, D, International Search Report, PCT Application No. PCT/US2016/017451, European Patent Office, Rijswijk, NL, dated May 23, 2016.
Huang, PTO-892, Notice of References Cited, U.S. Appl. No. 14/751,174, U.S. Patent and Trademark Office, Oct. 21, 2016.
Phan, PTO-892, Notice of References Cited, U.S. Appl. No. 14/751,175, U.S. Patent and Trademark Office, Dec. 29, 2016.
LG Electronics, "DL/UL solutions of LAA with LBT", Feb. 2015 (Feb. 8, 2015), 3GPP Draft; R1-150214 LAA LBT proposal, Feb. 8, 2015 3rd Generation Partnership Project (3GPP), Mobile Competence Centre; 650, route des Lucioles; F-06921 Sophia-Antipolis Cedex; France, Vol: RAN WG1, No:Athens, Greece; Feb. 9, 2015-Feb. 13, 2015, pp. 1-10.
Huang, P10-892, Notice of References Cited, U.S. Appl. No. 14/751,174, U.S. Patent and Trademark Office, Jun. 1, 2017.
Phan, PTO-892, Notice of References Cited, U.S. Appl. No. 14/751,175, U.S. Patent and Trademark Office, Jun. 27, 2017.
Huang, P10-892, Notice of References Cited, U.S. Appl. No. 15/690,166, U.S. Patent and Trademark Office, Oct. 6, 2017.
Skraparlis, PCT International Search Report, International Application No. PCT/US2016/018586, European Patent Office, Rijswijk, NL, May 24, 2016.
LG Electronics, "ACK/NACK transmission on PUSCH in TDD," R1-110879, 3GPP TSG RAN WG1 #64, Taipei, Taiwan, Feb. 21-25, 2011.
Skraparlis, PCT International Search Report, International application No. PCT/US2016/019087, European Patent Office, Rijswijk, NL May 5, 2016.
Huawei, "Analysis on the support of UL transmission for LAA," R1-150048, 3GPP TSG RAN WG1 meeting #80, Athens, Greece, Feb. 9-13, 2015.
LG Electronics, "DL/UL solutions of LAA with LBT," R1-150214, 3GPP TSG RAN WG1 Meeting #80, Athens, Greece, Feb. 9-13, 2015.
NTT Docomo, Inc., "Discussion on issues related to DL+UL option of LAA," R1-150417, 3GPP TSG RAN WG1 Meeting #80, Athens, Greece, Feb. 9-13, 2015.

* cited by examiner

METHOD AND APPARATUS FOR SCHEDULING USER EQUIPMENT UPLINK TRANSMISSIONS ON AN UNLICENSED CARRIER

CROSS-REFERENCE TO RELATED APPLICATIONS

This application is related to an application entitled "A Method and Apparatus for Scheduling User Equipment Uplink Transmissions on an Unlicensed Carrier," Motorola Mobility PCT/US16/18586 and an application entitled "A Method and Apparatus for Scheduling User Equipment Uplink Transmissions on an Unlicensed Carrier," Motorola Mobility PCT/US16/19087, both filed on even date herewith and commonly assigned to the assignee of the present application, which are hereby incorporated by reference.

BACKGROUND

1. Field

The present disclosure is directed to a method and apparatus for scheduling user equipment uplink transmissions on an unlicensed carrier.

2. Introduction

Presently, users use portable devices, otherwise known as User Equipment (UE), such as smartphones, cell phones, tablet computers, selective call receivers, and other wireless communication devices, on Long Term Evolution (LTE) networks. Users use the portable devices to download files, music, e-mail messages, and other data, as well as to watch streaming video, play streaming music, play online games, surf the web, and engage in other data intensive activities. Because of large amounts of downloaded data as well as large amounts of users, LTE carriers can now use unlicensed spectrum to complement the bandwidth of their LTE networks to provide faster data to users. This allows the users to download data faster on their portable devices. The unlicensed spectrum can include spectrum at 5 GHz, such as used by WiFi, and other unlicensed spectrum. LTE technology can be deployed in unlicensed spectrum using a carrier aggregation framework where a primary cell uses licensed spectrum, and a secondary cell is deployed in the unlicensed spectrum. Transmissions on the unlicensed spectrum carrier typically have to follow Discontinuous Transmission requirements (DCT requirements) due to regulatory requirements and due the need to co-exist with other wireless systems, such as Wi-Fi systems, LTE devices, such as UEs, and base stations, such as Enhanced Node-B's (eNBs), operating in the same spectrum. In some regulations, a LTE device may be required to perform Listen-Before-Talk (LBT) prior to transmitting on a carrier. If the device finds the channel is busy, then it should defer its transmission until the carrier becomes clear.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments can provide for a scheduling user equipment uplink transmissions on an unlicensed carrier.

According to a possible embodiment, a configuration indicating a window length can be received from a higher layer, where the higher layer can be higher than a physical layer. A grant can be received in a subframe, where the grant can be for transmitting a physical uplink shared channel on a serving cell operating on an unlicensed carrier. A set of subframes for possible transmission of the physical uplink shared channel can be determined based on the window length and the subframe in which the grant is received. Listen before talk can be performed on the unlicensed carrier to determine an earliest unoccupied subframe in the set of subframes. The physical uplink shared channel can be transmitted in the earliest unoccupied subframe in response to receiving the grant.

According to another possible embodiment, a grant for transmitting physical uplink shared channel on a serving cell operating on an unlicensed carrier can be received in a subframe. A set of subframes can be determined for possible transmission of the physical uplink shared channel. Listen before talk can be performed on the unlicensed carrier to determine an earliest unoccupied subframe in the set of subframes. A physical uplink shared channel can be transmitted in multiple subframes within the set of subframes on the unlicensed carrier, starting with the earliest unoccupied subframe, in response to receiving the grant.

According to another possible embodiment, listen before talk can be performed to determine when a subframe is available for uplink transmission. A sounding reference signal can be transmitted in a first discrete Fourier transform spread orthogonal frequency division multiplexing symbol of the subframe when listen before talk indicates that the subframe is available. A physical uplink shared channel can be transmitted in at least a portion of a remaining part of the subframe.

Figure 1:
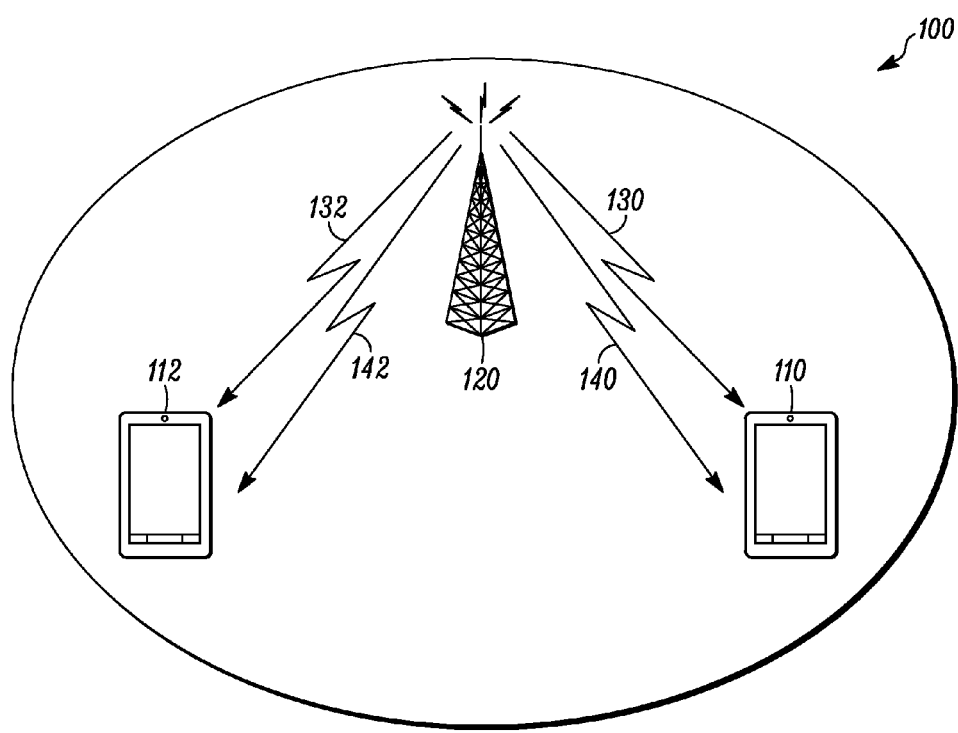
FIG. 1 is an example block diagram of a system according to a possible embodiment.

FIG. 1 is an example block diagram of a system 100 according to a possible embodiment. The system 100 can include a first User Equipment (UE) 110 and a base station 120. The base station 120 can be an Enhanced Node-B (eNB), such as a cellular base station, a Long Term Evolution (LTE) base station, or any other base station. The first UE 110 and the base station 120 can communicate on different cells 130 and 140. The cell 130 can be a first cell, such as a primary cell and the UE 110 can be connected to the primary cell. The cell 140 can be a second cell, such as a secondary cell. Furthermore, the second cell 140 can be a cell that operates on unlicensed spectrum. The cells 130 and 140 can also be cells associated with other base stations, can be a macro cells, can be micro cells, can be femto cells, and/or can be any other cells useful for operation with a LTE network. The system 100 can also include a second UE 112 that can communicate with the base station 120 on cells 132 and 142 in a similar manner to the first UE 110, where the cell 132 can be a primary cell and the cell 142 can be a secondary cell. The UEs 110 and 112 can be any devices that can access a wireless wide area network. For example, the UEs 110 and 112 can be wireless terminals, portable wireless communication devices, smartphones, cellular telephones, flip phones, personal digital assistants, personal computers having cellular network access cards, selective call receivers, tablet computers, or any other device that is capable of operating on a wireless wide area network.

In operation, UE uplink Physical Uplink Shared Channel (PUSCH) transmissions can be supported using different approaches. For Frequency Division Duplex (FDD) with Transmission Time Interval (TTI) bundling disabled, if a UE receives an uplink grant in subframe n from an eNB, it can transmit PUSCH in subframe n+4 in response to that grant. For LTE, a subframe typically can have a 1 ms duration. For example, the 4 subframe duration between grant reception and UE transmission can be the maximum duration allowed for UE hardware processing, such as the time needed by the UE hardware to decode the grant and prepare the PUSCH transmission. The value "4" is an example value used throughout this disclosure, but in principle, it is possible to have a different value. For example, 'n+4' can effectively mean 'n+dmax' where dmax can be a maximum duration allowed for UE hardware processing after receiving a grant in subframe n. For FDD with TTI bundling enabled, if a UE receives an uplink grant in subframe n, it can transmit PUSCH in a predefined set of subframes {n+4, n+5, . . . n+4+L−1} in response to that grant, where L can be configured by higher layers that are higher than the physical layer. For Time Division Duplex (TDD), if a UE receives an uplink grant in subframe n, it can transmit PUSCH in a predefined subframe n+k in response to that grant, where k can be determined from predefined table(s) in an LTE specification. For TDD with TTI bundling enabled, if a UE receives a grant in subframe n, the UE can transmit PUSCH in a predefined set of subframes {n+k1, n+k2, . . . n+kL} in response to that grant, where L, k1, and k2 . . . kL can be determined from predefined table(s) in the specification. For TDD, if an 'ul index' field, such as TDD Uplink/Downlink (UL/DL) configuration 0, is transmitted in the uplink grant and if a UE receives the uplink grant in subframe n, the UE can transmit PUSCH in a predefined subframe n+k, n+7, or both subframes, in response to that grant, depending on the 'ul index' field setting in the grant, where k can be determined from predefined table(s) in the specification. In all the above approaches, the UE can transmit PUSCH in one or multiple predefined subframes in response to receiving a grant.

For operation in unlicensed spectrum due to regulatory requirements, and due the need to co-exist with other wireless systems, such as Wi-Fi, and LTE devices, such as UEs and eNBs, before transmitting on an unlicensed carrier, the LTE devices, such as UEs typically have to check whether the carrier is busy using some form of 'Listen Before Talk' (LBT) mechanism, and can begin transmissions only if the carrier is free. LBT typically can include measuring energy on the carrier, sometimes referred to as sensing, for a short duration, such as 9 us or 20 us, and determining whether the measured energy is less than a threshold, such as −82 dBm or −62 dBm. If the energy is less than the threshold, the carrier is determined to be free. Some examples of LBT can include the Clear Channel Assessment-Energy Detect (CCA-ED) and Clear Channel Assessment-Carrier Sense (CCA-CS) mechanisms defined in IEEE 802.11 specifications, CCA mechanisms specified in the ETSI EN 301 893 specification, and other forms of LBT. Transmissions on the carrier typically also have to follow Discontinuous Transmission (DCT) requirements. For example, an LTE device, such as a UE, can continuously transmit for Xms, such as where X can be 4 ms as per some regulations and up to 13 ms for some other regulations, after which it may have to cease transmission for some duration, sometimes referred as an idle period, perform LBT again, and reinitiate transmission only if LBT is successful. The LTE device may perform LBT towards the end of the idle period.

Therefore, for operation in unlicensed spectrum, after a UE receives a grant from an eNB indicating the UE to perform transmission in unlicensed spectrum, the UE often may have to perform LBT, and transmit only if LBT is successful, such as when the carrier is determined to be free. The terms LBT and CCA are used interchangeably in the disclosed embodiments. Both terms refer to the aspect of the device having to check whether the carrier is free before transmission. If the carrier is busy, the UE may not transmit, such as when it has to skip a PUSCH transmission, and may have to wait for another scheduling grant from the eNB. For example, if a UE receives a grant in subframe n for transmission in subframe n+4, the UE may have to perform LBT that enables UE transmission in subframe n+4. If the carrier is free, the UE can transmit PUSCH in subframe n+4. If the carrier is busy, the UE may have to skip the transmission in subframe n+4 and wait for another grant. Since the eNB may not accurately predict in advance, such as in subframe n, when the carrier will be free near the UE, this approach may be inefficient, as it can lead to a number of skipped UE transmissions with each skipped UE transmission leading to an extra grant. Thus, embodiments can provide signaling enhancements that can address these and other issues.

Some embodiments can provide signaling enhancements that give a UE multiple transmission opportunities for each received grant, and let the UE determine the subframe where the PUSCH is transmitted based on carrier availability, such as based on the result of LBT. An eNB can detect which transmission opportunities a UE has utilized based on, for example, blind detection. Allowing too much flexibility to the UE may increase eNB complexity, where the eNB receiver may have to blindly determine the subframe in which the PUSCH is transmitted by the UE. Given this, some embodiments provide signaling approaches that provide good trade-offs between UE transmission flexibility and eNB complexity. For some embodiments, the UE can be configured with a Primary cell (Pcell) that can operate on a licensed carrier and a Secondary cell (Scell) that can operate on an unlicensed carrier. The grant in response to which the UE transmits PUSCH on the unlicensed carrier can be received by the UE on either the Pcell, such as on a licensed carrier, or the Scell, such as on an unlicensed carrier. The UE can perform LBT using the mechanisms described below.

For some embodiments, the UE can send a Hybrid Automatic Repeat Request Identifier (HARQ ID) and HARQ sub identifier (HARQ subID) along with its PUSCH transmission or retransmission using the mechanisms described below.

Figure 2:
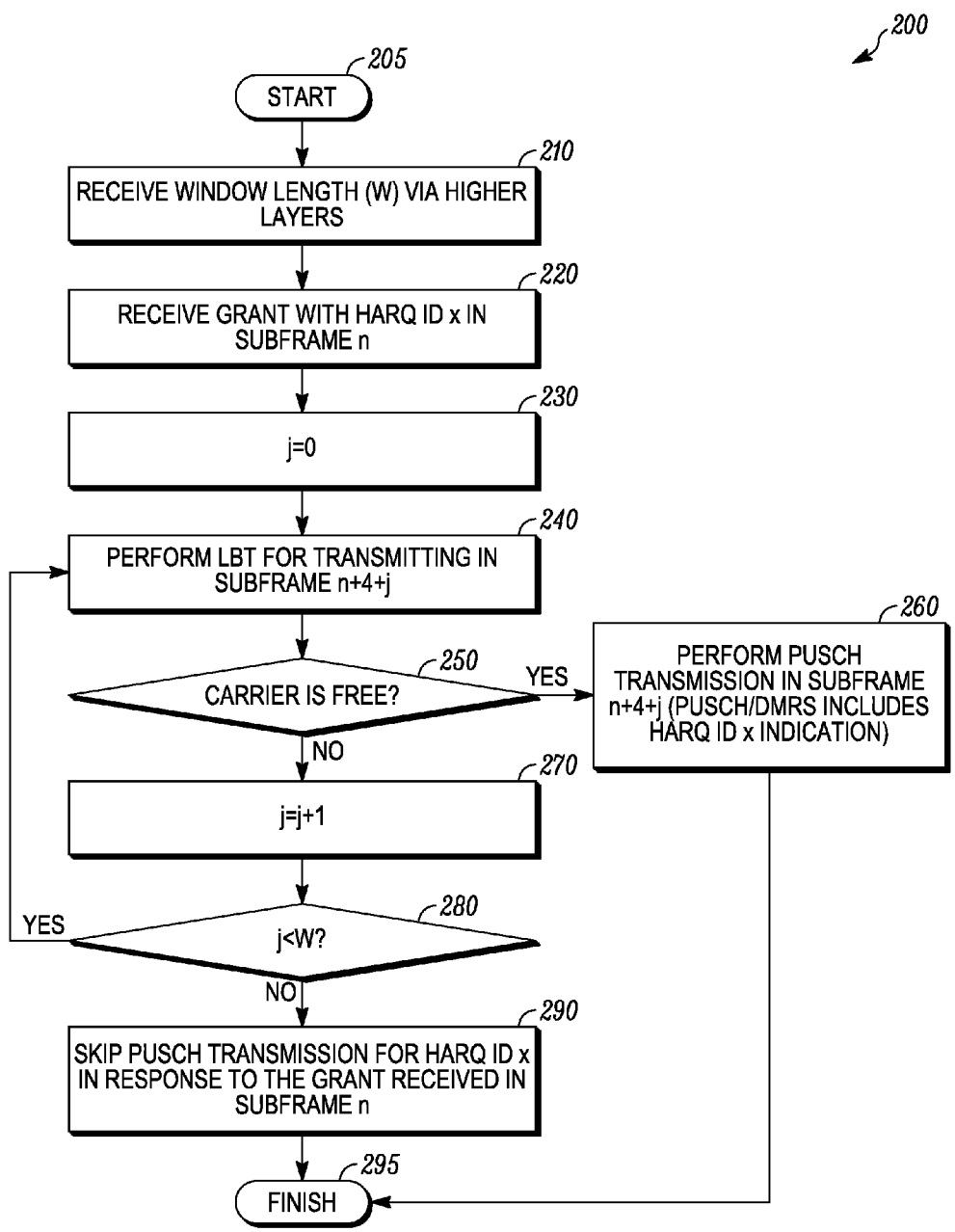
FIG. 2 is an example flowchart illustrating a user equipment procedure for a first option for transmitting a physical uplink shared channel on unlicensed carrier according to a possible embodiment.

FIG. 2 is an example flowchart 200 illustrating a UE procedure for a first option for transmitting PUSCH on unlicensed carrier according to a possible embodiment. At 205, the flowchart 200 can begin. At 210, a UE can be configured via higher layers with a transmission opportunity window length (W), where W can be 1, 2, 3, or 4 subframes, and where W=1 can correspond to current LTE operation, such as a default value. The window length (W) may also be set to any other useful value.

At 220, the UE can receive an uplink grant in subframe n. The grant can contain bits indicating a HARQ ID, such as a 3 bit HARQ-ID. The number of bits used for indicating the HARQ ID may depend on a maximum number of HARQ processes (M_UL_HARQ). For example, for LTE uplink, the maximum number of HARQ processes can be either 8 for non-Multiple Input Multiple Output (MIMO) uplink or 16 for MIMO uplink (UL-MIMO) per component carrier. For UL-MIMO, two HARQ processes associated with the subframe n may be HARQ ID and HARQ ID+8 for transport block 1 and transport block 2 respectively, that may require indication of only HARQ ID for the lowest index, such as the enabled, transport block in the uplink grant. In this case, M_UL_HARQ can be set to 8. A transport block can be the data from the upper layer, such as a Medium Access Control (MAC) layer, given to the physical layer in a LTE system. Signaling of the HARQ ID can explicitly enable an eNB to schedule an uplink transmission asynchronously. For example, the retransmissions for a given uplink HARQ processes may be adaptable in time and need not occur with a fixed Round Trip Time (RTT). The uplink grant received by the UE can also contain bits indicating modulation and coding scheme (MCS) to be used for PUSCH transmission, bits indicating a resource allocation (RA) within a subframe, such as the Resource Blocks (RBs) within a subframe to use for PUSCH transmission, bit(s) indicating whether the grant is for new data, such as a grant for an initial or new transmission, or indicating the grant is retransmission (for example, by using a 1 bit New Data Indicator (NDI)), and other bits indicating additional control information.

If the UE receives an uplink grant with HARQ ID x in subframe n, in response to the grant, the UE can attempt to transmit PUSCH in subframe n+4. If the carrier is not free for transmission in subframe n+4, such as when LBT is not successful, the UE can attempt PUSCH transmissions in subsequent subframes until a subframe is free or until the window length (W) is reached. For example, at 230, a counter j can be set to zero. At 240, the UE can perform LBT for transmitting PUSCH in subframe n+4+j. At 250, the UE can determine whether the carrier is free based on the results of LBT.

If the carrier is free, at 260, with each PUSCH transmission, the UE can include the associated HARQ ID, such as the HARQ ID provided by the grant in response to which the PUSCH transmission is being made and the flowchart can end at 295. The HARQ ID can be implicitly communicated by a Demodulation Reference Signal (DMRS), such as a cyclic shift for the DMRS and Orthogonal Cover Code (OCC) index, associated with the PUSCH transmission. Alternately, the HARQ ID can be explicitly sent as part of the PUSCH transmission.

If the carrier is not free, at 270, the UE can increment the counter j. At 280, the UE can determine if the counter is still below the window value (W). If it is, the flowchart 200 can return to 240 and continue accordingly. If the counter has reached the window length value (W), at 290, the UE can skip the PUSCH transmission for the HARQ ID (x) in response to the grant received in subframe n. At 295, the flowchart 200 can end.

If the UE has PUSCH transmissions for multiple grants queued up due to lack of carrier availability in previous transmissions, the UE can prioritize the PUSCH transmission corresponding to the earliest grant. For example, if the UE receives a grant in subframe n, such as for HARQ ID ($x_1$), and another grant in subframe n+1, such as for HARQ ID ($x_2$), and if LBT fails for subframe n+4 but is successful for subframe n+5, the UE can transmit the PUSCH corresponding to grant received in subframe n, such as the PUSCH corresponding to HARQ ID ($x_1$), and can attempt to transmit the PUSCH corresponding to HARQ ID ($x_2$) in subsequent subframes until the window length (W) is reached. Alternatively, higher layers may indicate the priority for HARQ ID's, and the UE can follow the priority order in determining which HARQ ID is prioritized for transmission, when multiple HARQ ID's have pending transmission. Alternatively, the UE can prioritize PUSCH transmissions based on its own prioritization rules, for example, based on the type of traffic associated with the PUSCH transmission. In another example, if LBT fails in subframe n+4 and succeeds in subframe n+5, if a power head room report becomes available in subframe n+4 or subframe n+5, the UE can transmit a PUSCH containing the power head room report in subframe n+5.

The window length (W) can be an eNB implementation choice. For example, if an eNB picks W=4, the UE can get 4 attempts to transmit PUSCH for a given uplink grant, but the eNB may have to blindly attempt to decode PUSCH corresponding to a maximum of 4 separate grants for each scheduled UE in each subframe. If the eNB picks W=1, blind detection of PUSCH is not necessary, but the UE has only one attempt/transmission opportunity to send PUSCH and the UE can be more likely to skip the PUSCH transmission if LBT is not successful, such as when the channel is busy. Given the trade-offs involved, the eNB can pick a value for W depending on factors such as loading of the operating carrier and/or Quality of Service (QoS) requirements for the UE's UL traffic. In a first example, the eNB can pick a smaller value for W, such as W=1, when it determines that the carrier is mostly free, such as when LBT at the UE is more like to succeed, and can pick a larger value of W, such as W=4, when the carrier is busy, such as when LBT at the UE is less likely to succeed. In a second example, the eNB can pick a larger value of W while scheduling delay sensitive traffic and a smaller value of W for best effort traffic. In a third example, the eNB can pick a larger value of W for UEs whose PUSCH transmission subframes can be blindly detected with more confidence, such as for UEs that are closer to the eNB whose signals will be received by the eNB with higher SNR and hence the presence/absence of PUSCH from those UEs can be determined with more confidence than UEs with low receive SNR.

Figure 3A:
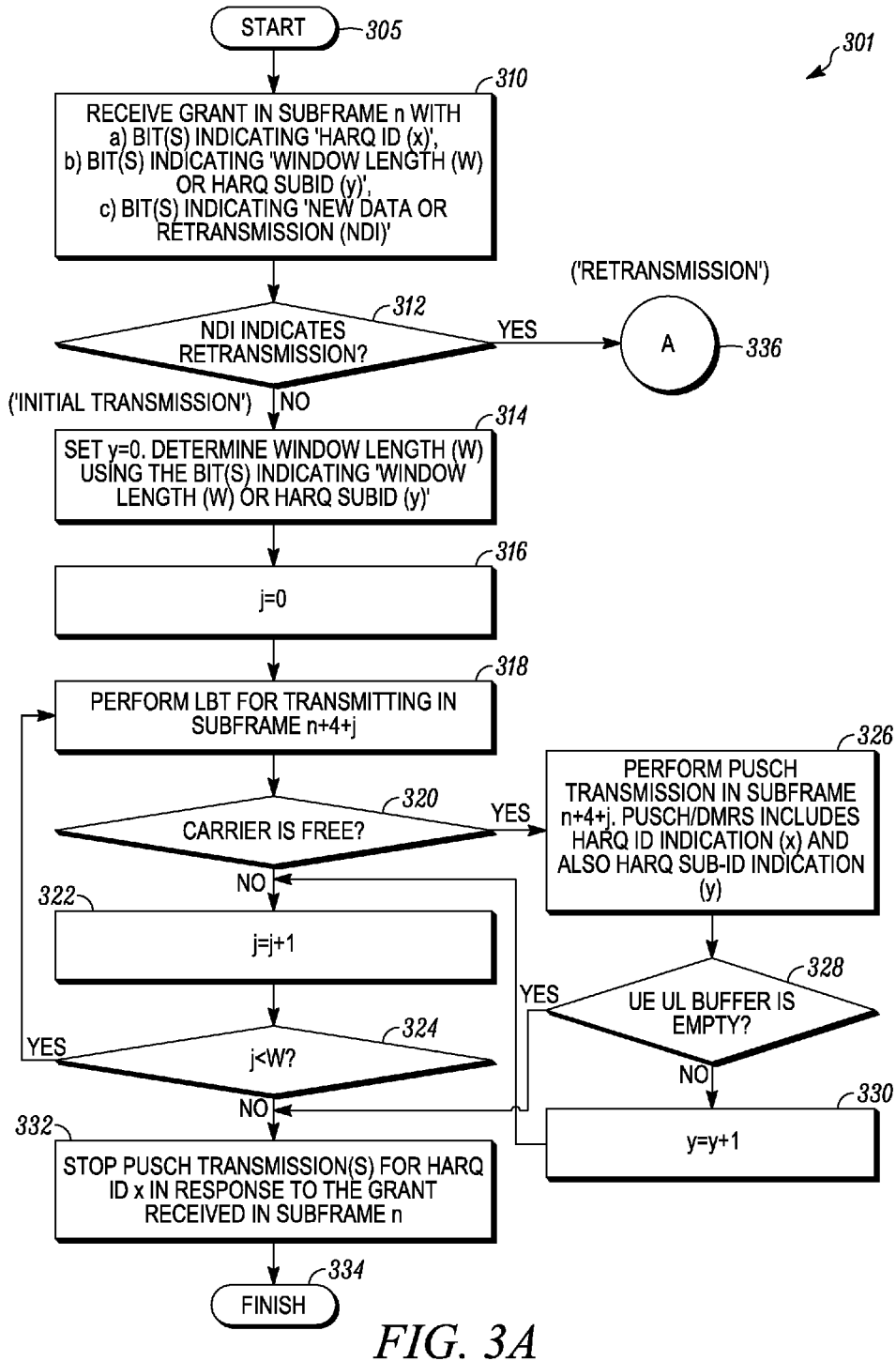
FIGS. 3a and 3b are example flowcharts illustrating a user equipment procedure for transmitting a physical uplink shared channel on unlicensed carrier according to a possible embodiment.
Figure 3B:
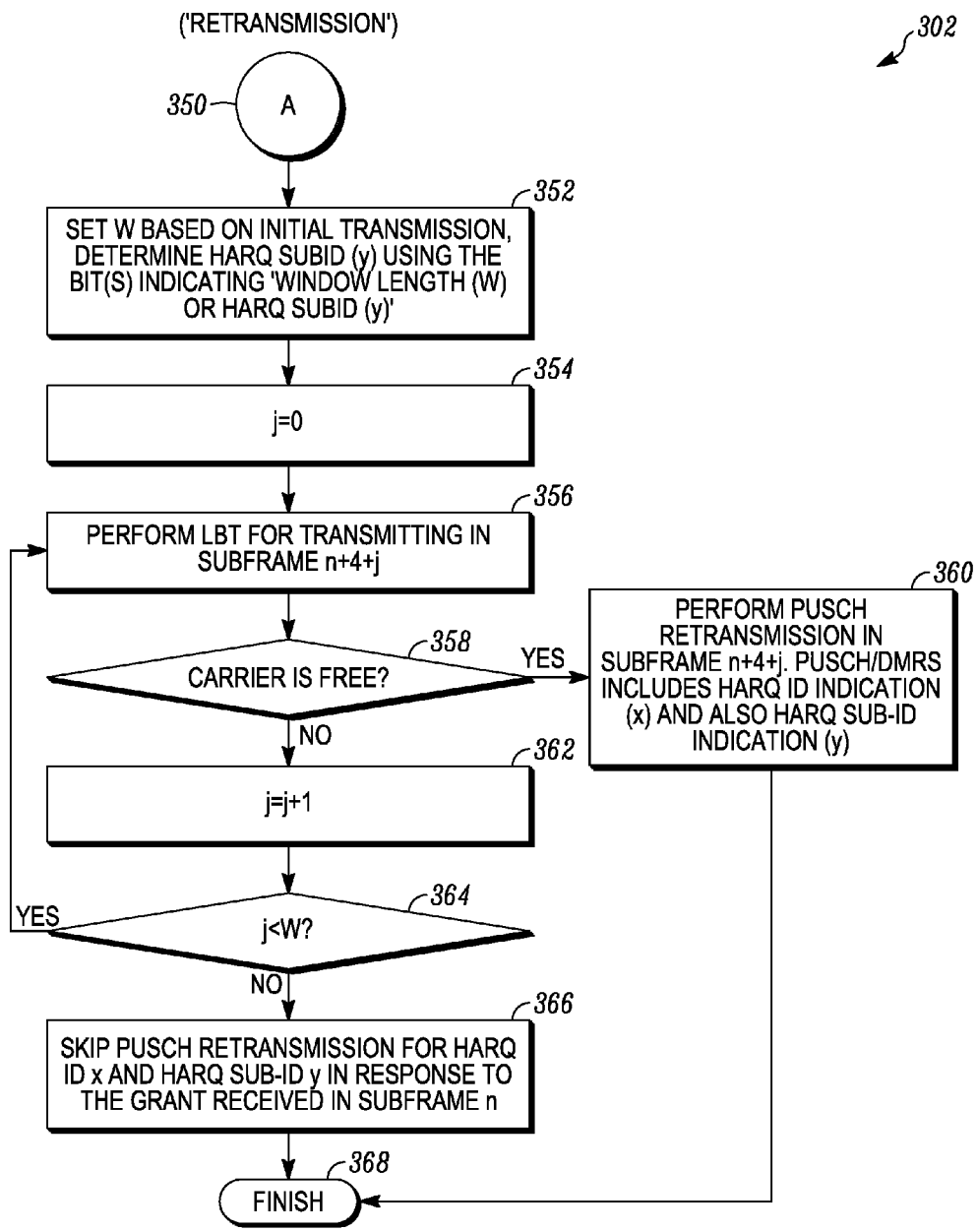

FIGS. 3a and 3b are example flowcharts 301 and 302 illustrating a UE procedure for a second option for transmitting PUSCH on unlicensed carrier for initial transmission and retransmission according to a possible embodiment.

In the first option, when the eNB configures W>1 and sends a grant to a UE indicating PUSCH transmission in a certain set of RBs, the RBs may be blocked for all subframes falling within the transmission window W. For example, if W=4 and a grant is sent in subframe n, indicating PUSCH transmission in RBs 1-10, the UE can be allowed to transmit PUSCH in RBs 1-10 in subframes n+4, n+5, n+6, n+7. Since, the eNB does not know which subframe the UE may transmit; it cannot schedule those RBs for other UEs. Multiple User Multiple Input Multiple Output (MU MIMO) can be possible, albeit with possible restrictions, such as based on available DMRS cyclic shifts, same RB allocations for all the MU co-scheduled UEs. Also, since the UE transmits PUSCH in only one subframe of the window, the RB allocation for other subframes may be wasted even if the carrier is free. For example, for a grant sent in subframe n, if LBT at the UE succeeds for subframe n+4, the RBs 1-10 for subframes n+5, n+6 and n+7 are left unused. The eNB can send grants to the UE in subframes n+1, n+2, n+3 . . . assuming that the carrier is free in subframes n+5, n+6, n+7 respectively, but if the carrier is busy, the grants can be wasted, which may lead to unnecessary DL control overhead. The second option can attempt to address this issue by enabling the UE to make multiple PUSCH transmissions in response to a single grant. Compared to the first option, the second option may require additional bits in Downlink Control Information (DCI), such as 2 extra bits if W=4, 3 extra bits if W=8, etc.

At 305, the flowchart 301 can begin. At 310 a UE can receive an uplink grant in subframe n. The grant can contain bits indicating the HARQ ID (x), such as a 3 bit HARQ-ID. The grant can also contain bit(s) indicating whether the grant is for new data, such as an initial transmission or a new transmission, or the grant is not for new data, such as by using 1 a bit New Data Indicator (NDI). The grant can additionally contain additional bits, such as 2 bits. For the additional bits, if the grant is for new data, such as an initial transmission, based on a NDI toggle, the additional bits can indicate a window length (W). For example, 00 can indicate W=1 subframe, 01 can indicate W=2 subframes, 10 can indicate W=3 subframes, and 11 can indicate W=4 subframes. If the grant is for retransmissions, such as when NDI is not toggled, the additional bits can indicate a HARQ subID of the packet for which the retransmission is requested. The number of additional bits used can depend on the maximum allowed window length (Wmax). This can be fixed in the specification. Alternately, this can be a configurable value, indicated to the UE via higher layers. For example, if a Radio Resource Control (RRC) indicates Wmax=8, the UE can expect the UL grants to have 3 additional bits to indicate the 'window length (W) or the HARQ subID'. The uplink grant received by the UE can also contain bits indicating a modulation and coding scheme (MCS) to be used for PUSCH transmission(s), bits indicating a resource allocation (RA) within a subframe, such as the RBs to use for PUSCH transmission(s), and other bits indicating additional control information.

If at 312, the NDI bit(s) indicate that the grant is for an initial transmission, the rest of flowchart 301 can be utilized. In particular, in response to the grant received in subframe n, the UE can transmit PUSCH in subframe n+4 if the LBT for subframe n+4 is successful. If the UE still has data in its UL buffer, the UE can transmit PUSCH in subframe n+5 in response to the same grant received in subframe n, if the LBT for subframe n+5 is also successful. The UE can continue transmitting PUSCH in subsequent subframes if LBT is successful for those subframes and the UE has data in its UL buffer until the window length (W) signaled in the grant is reached. With each PUSCH transmission, the UE can include the associated HARQ ID that was provided by the grant in response to which the PUSCH transmission(s) are being made.

Since multiple PUSCH transmissions can be made in response to one grant and one HARQ ID, with each PUSCH transmission, the UE can also include a HARQ subID to enable the eNB to individually identify each PUSCH transmission. For an example when the grant received in subframe n has a HARQ ID of zero (x=0) and window length W=4, and assuming LBT is successful for all subframes for the window, the HARQ subID (y) can be set where the UE can send x=0 and y=0 for the first PUSCH transmission made in response to the grant in subframe n+4, where x is the HARQ ID and y is the HARQ subID. Then, if the UE UL buffer is not empty, the UE can send x=0 and y=1 for the second PUSCH transmission made in response to the grant in subframe n+5. If the UE UL buffer is still not empty, the UE can send x=0 and y=2 for the third PUSCH transmission made in response to the grant in subframe n+6. If the UE UL buffer is still not empty, the UE can send x=0 and y=3 for the fourth PUSCH transmission made in response to the grant in subframe n+7.

For an example where the grant received in subframe n has a HARQ ID of zero (x=0), and a window length W=4 and assuming LBT is unsuccessful for subframe n+4 and n+6, but successful for subframes n+5 and n+7, the HARQ subID (y) can be set where the UE can send x=0 and y=0 for the first PUSCH transmission made in response to the grant in subframe n+5. If the UE UL buffer is not empty, the UE can send x=0 and y=1 for the second PUSCH transmission made in response to the grant in subframe n+7. When the eNB has to request a retransmission of a PUSCH that was transmitted by the UE along with HARQ ID (x) and HARQ subID (y), the eNB can include the same HARQ ID (x) and HARQ subID (y) in the re-transmission grant sent to the UE and can set the NDI bit(s) to indicate a retransmission request.

For example, if at 312, the NDI bit(s) indicate that the grant is for an initial transmission, at 314, the HARQ subID can be set to 0 (y=0). The window length (W) can be determined using bit(s) indicating the 'window length (W) or HARQ subID (y)' (for example, if the grant is for an initial transmission, the UE can use those bits for determining window length (W); if the grant is for a re-transmission the UE can use those bits for determining HARQ subID). At 316, a counter j can be set to zero. At 318, LBT can be performed for transmitting in subframe n+4+j. If at 320, LBT indicates the carrier is not free, at 322, the counter j can be incremented. If at 324 the counter j has not reached the window length (W), LBT can be performed in a next subframe at 318.

If the carrier is free at 320, then at 326, PUSCH transmissions can be performed in subframe n+4+j and the PUSCH/DMRS can include the HARQ ID and the HARQ subID. If the UE uplink buffer is not empty at 328, at 330 the HARQ subID can be incremented, i.e., y=y+1. If the UE uplink buffer is empty at 328 or if the counter j has reached the window length (W) at 324, at 332 PUSCH transmissions can cease for the grant received in subframe n for that particular HARQ ID and at 334, the flowchart 301 can end.

If at 312, the NDI bit(s) indicate that the grant is for a retransmission, the flowchart 301 can advance to 336 to branch to step 350 of flowchart 302. In particular, in the flowchart 302 the additional bits in the grant can indicate the HARQ subID of the corresponding initial transmission for which PUSCH retransmission is requested as described earlier. The window length (W) can be the window length determined by the UE for the corresponding initial transmission for which the PUSCH retransmission is requested. The UE can attempt to make the PUSCH retransmission in subframe n+4, and, if the carrier is not free for transmission in subframe n+4, such as when LBT is not successful for that subframe, the UE can attempt PUSCH retransmission in subsequent subframes until a subframe is available or until the window length is reached. The UE can include the HARQ ID and HARQ subID indicated by the retransmission grant along with its PUSCH retransmission. Note that unlike the initial/new transmission case, the UE may only send one PUSCH retransmission in response to a grant that indicates a retransmission.

For example, at 350 the flowchart 302 can begin. At 352, the window length (W) can be set based on the initial transmission. The HARQ subID can be determined using bits indicating the 'window length (W) or the HARQ subID transmitted' in the grant (for example, if the grant is for an initial transmission, the UE can use those bits for determining window length (W); if the grant is for a re-transmission, the UE can use those bits for determining HARQ subID). At 354, a counter j can be set to zero. At 356, LBT can be performed for transmitting PUSCH in subframe n+4+j on a carrier. If at 358 LBT indicates the carrier is free, at 360 PUSCH transmission can be performed in subframe n+4+j. The PUSCH/DMRS can include the HARQ ID, such as x, and the HARQ subID, such as y. If at 358 LBT indicates the carrier is busy, at 362 the counter j can be incremented. If at 364 the counter j is less than the window length (W), at 356 LBT can be performed for the next subframe. If the counter j has reached the window length (W), at 366, the PUSCH retransmission can be skipped for the HARQ ID and the HARQ subID indicated in the grant received in subframe n. At 368, the flowchart 302 can end.

Figure 4A:
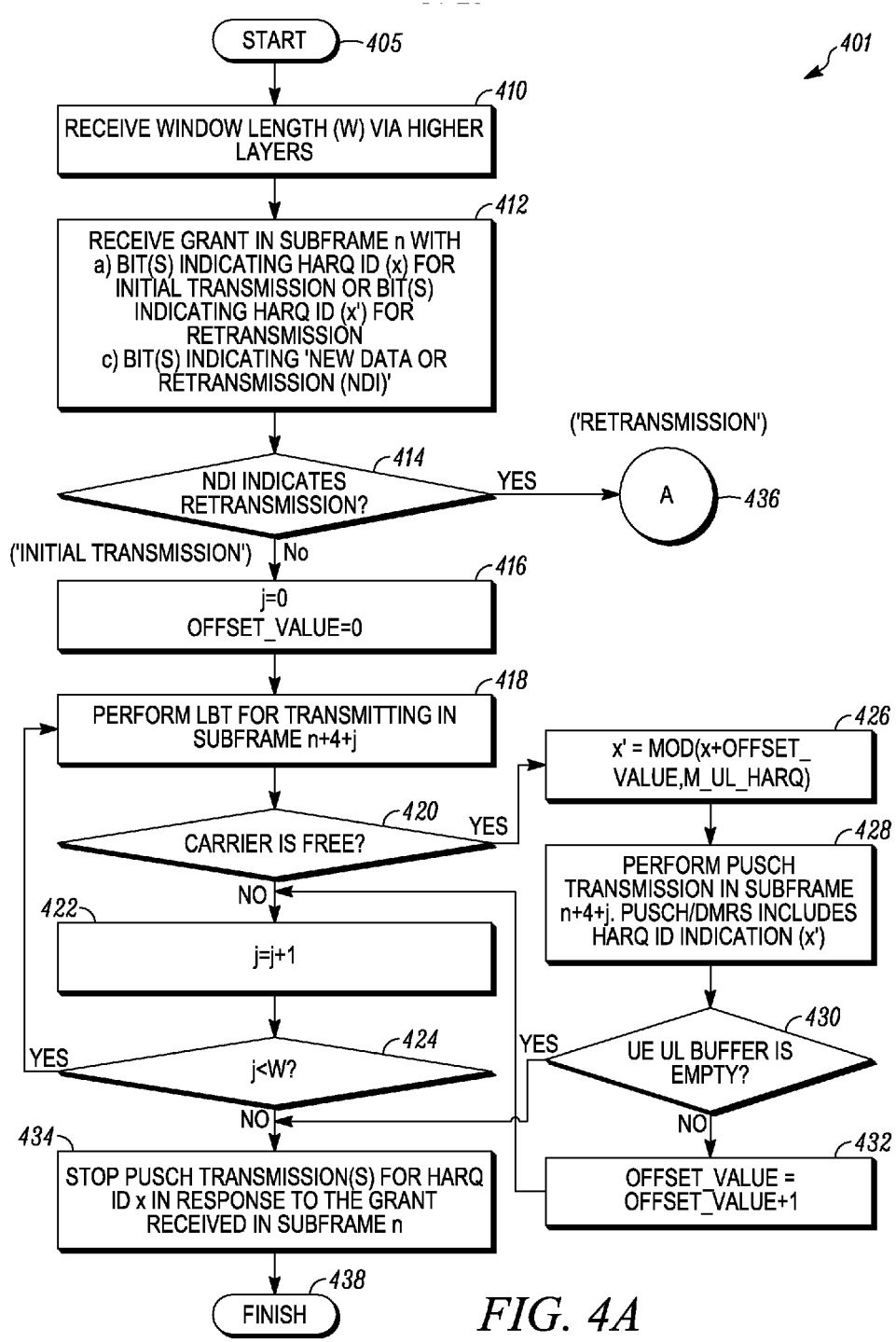
FIGS. 4a and 4b are example flowcharts illustrating a user equipment procedure for transmitting a physical uplink shared channel on unlicensed carrier according to a possible embodiment.
Figure 4B:
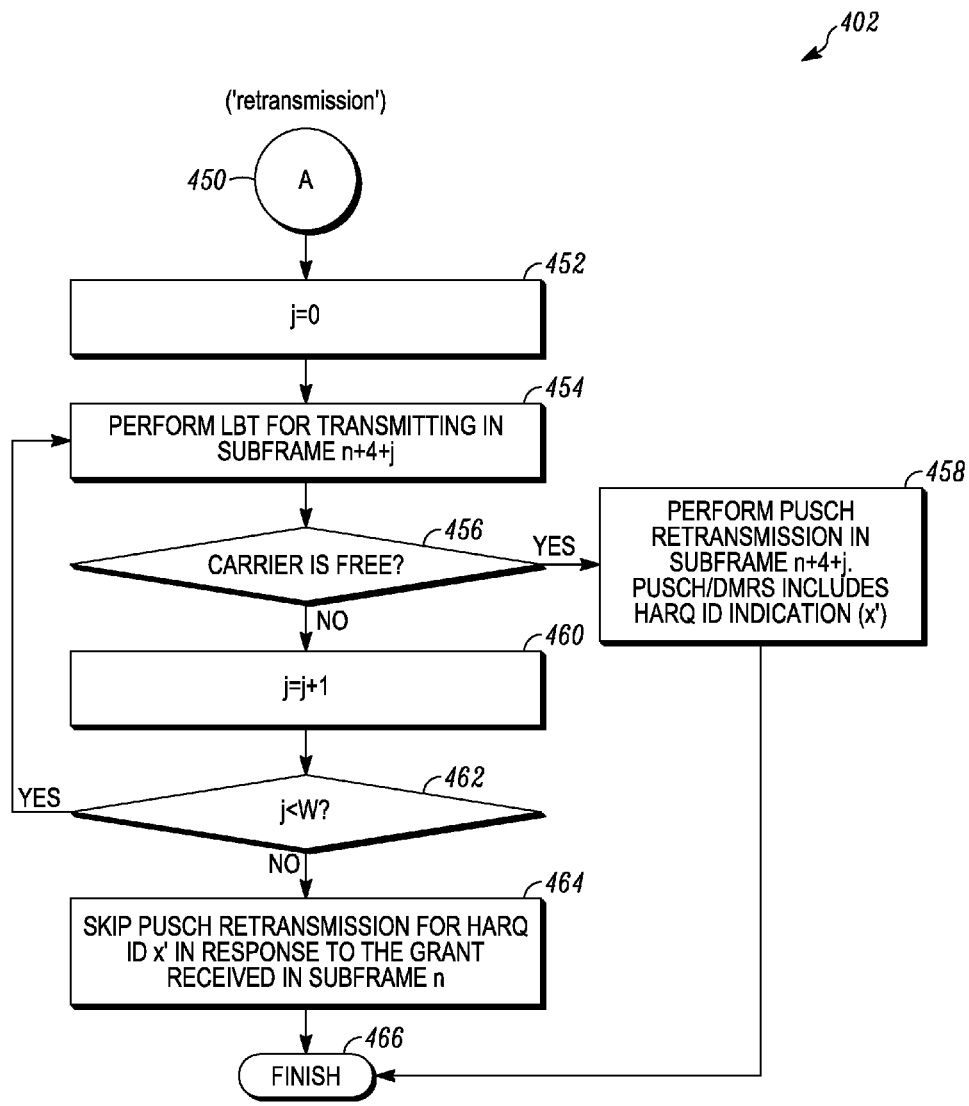

FIGS. 4a and 4b are example flowcharts 401 and 402 illustrating a UE procedure for a third option for transmitting PUSCH on unlicensed carrier for initial transmission and retransmission according to a possible embodiment. In the second option above, the UE may need to signal additional HARQ subID bits in addition to the HARQ ID bits along with its PUSCH transmissions to identify the individual PUSCH transmission(s) that are made in response to a single grant. For example, assuming 3 bits for HARQ ID and 2 bits for HARQ subID, the UE may have to send a total of 5 bits along with each of its PUSCH transmission. A third option can attempt to address this issue by avoiding the need to transmit a HARQ subID.

For the third option, at 405, the flowchart 401 can begin. At 410, a UE can receive a window length (W). The window length (W) can be configured by higher layers or the window length (W) can be signaled using bits in a uplink grant. At 412, the UE can receive an uplink grant in subframe n. The grant can contain bits indicating HARQ ID. For example, 3 bits can be used to indicate HARQ ID. The grant can also contain bit(s) indicating whether the grant is for new data, such as an initial transmission or new transmission, or not. For example this can be done, such as by using a 1 bit NDI. The uplink grant received by the UE can further contain bits indicating a Modulation and Coding Scheme (MCS) to be used for PUSCH transmission(s), bits indicating Resource Allocation (RA) within a subframe, such as RBs to use for PUSCH transmission(s), and other bits indicating additional control information.

If at 414 the NDI bit(s) indicate that the grant is for an initial transmission, in response to the grant received in subframe n, the UE can transmit PUSCH in subframe n+4 if the LBT for subframe n+4 is successful. If the UE still has data in its UL buffer and if the LBT for subframe n+5 is also successful, the UE can transmit PUSCH in subframe n+5 in response to the same grant received in subframe n. The UE can continue transmitting PUSCH in subsequent subframes if LBT for those subframes is successful and the UE still has data in its UL buffer until a window length (W) is reached.

With each PUSCH transmission, the UE can include an associated HARQ ID (x'), where x' is the value of the associated HARQ ID. The associated HARQ ID (x') transmitted by the UE can be determined from the HARQ ID (x) provided by the grant, such as the grant in response to which the PUSCH transmission(s) are being made. According to a possible implementation, the value of the associated HARQ ID (x') can be determined using a formula x'=MOD(x+offset_value, M_UL_HARQ), where 'offset_value' is set to 0 for the first PUSCH transmission, and is incremented by one for each additional PUSCH transmission made in response to the same grant, M_UL_HARQ is the Maximum number of UL HARQ processes, and x is the HARQ ID sent with the uplink grant. The M_UL_HARQ value can be defined in the specification or set by higher layers. The formula can limit x' to the M_UL_HARQ and other equations or processes can be used for the same effect. For an example where the grant received in subframe n has HARQ ID x=0 and window length W=4, assuming LBT is successful for all subframes for the window, and assuming M_UL_HARQ=8, the UE can send associated HARQ ID x'=0 for the first PUSCH transmission made in response to the grant in subframe n+4. If the UE UL buffer is not empty, the UE can send associated HARQ ID x'=1 for the second PUSCH transmission made in response to the grant in subframe n+5. If the UE UL buffer is still not empty, the UE can send associated HARQ ID x'=2 for the third PUSCH transmission made in response to the grant in subframe n+6. If the UE UL buffer is still not empty, UE can send associated HARQ ID x'=3 for the fourth PUSCH transmission made in response to the grant in subframe n+7.

For an example where the grant received in subframe n has HARQ ID x=0 and window length W=4, assuming LBT is unsuccessful for subframe n+4 and n+6 but successful for subframes n+5 and n+7, and assuming Maximum number of UL HARQ processes=8, the UE can send associated HARQ ID x'=0 for the first PUSCH transmission made in response to the grant in subframe n+5. If the UE UL buffer is not empty, the UE can send associated HARQ ID x'=1 for the second PUSCH transmission made in response to the grant in subframe n+7.

For example, at 416, a counter j can be set to 0 and the offset_value can be set to 0. At 418, LBT can be performed for transmitting PUSCH in subframe n+4+j. If at 420, the carrier is not free, at 422, the counter j can be incremented by 1. If j is less than the window length (W) at 424, then LBT can be performed for a next subframe at 418. If at 420, the carrier is free, at 426, x' can be set to MOD(x+offset_value, M_UL_HARQ). At 428, the PUSCH transmission can be performed in subframe n+4+j and PUSCH/DMRS can include the associated HARQ ID indication x'. If at 430 the UE uplink buffer is not empty, at 432 the offset_value can be incremented and the process can continue at 422. If the uplink buffer is empty at 430 or the counter j has reached the window length (W) at 434, the PUSCH transmissions can stop for HARQ ID x for the grant received in subframe n. At 438, the flowchart 401 can end.

If at 414, the NDI indicates a retransmission, then the UE can determine that the eNB has requested a retransmission of a PUSCH that was transmitted by the UE with associated HARQ ID (x'). In the retransmission grant, the eNB can include the same HARQ ID (x') as the associated HARQ ID (x') that was previously sent by the UE, and sets the NDI bit(s) to indicate a retransmission request. The flowchart 401 can then advance to step 450 of flowchart 402 via step 436. The UE can then attempt to make the PUSCH retransmission in subframe n+4, and if the carrier is not free for transmission in subframe n+4, such as when LBT for subframe n+4 is not successful, the UE can attempt PUSCH retransmission in subsequent subframes until a subframe is available or until the window length (W) is reached. If a subframe counter j gets incremented for multiple subframes and does not remain smaller than window length (W), the UE can skip the PUSCH retransmission for HARQ ID x' in response to the grant received in subframe n. When LBT determines the carrier is free, the UE can include the same associated HARQ ID (x') indicated by the retransmission grant along with its PUSCH retransmission. Unlike the initial transmission case, the UE may only send one PUSCH retransmission in response to a grant that indicates a retransmission.

For example, at 452, a counter j can be set to 0. At 454, LBT can be performed for transmitting PUSCH in subframe n+4+j. If the carrier is free at 456, at 458 a PUSCH transmission can be performed in subframe n+4+j and PUSCH/DMRS can include the HARQ ID indication (x') and the flowchart can end at 466. If the carrier is not free at 456, at 460 the counter j can be incremented. If at 462 the counter j is less than the window length W, at 454 LBT can be performed for transmitting PUSCH in a next subframe. If at 462 the counter j has reached the window length, at 464 the PUSCH transmission can be skipped for HARQ ID x' from the grant received in subframe n. At 466, the flowchart 402 can end.

A UE procedure for a fourth option for transmitting PUSCH on unlicensed carrier for initial transmission and retransmission according to a possible embodiment can attempt to avoid a requirement for the UE to transmit HARQ ID along with its PUSCH transmissions. For example, the second option discussed above may require the UE to send the HARQ ID and also a HARQ sub ID, along with each PUSCH transmission to enable the eNB to uniquely identify the Transport Block(s) (TB(s)) associated with that PUSCH transmission. The third option discussed above may require the UE to send an associated HARQ ID, along with each PUSCH transmission to enable the eNB to uniquely identify the Transport Block(s) (TB(s)) associated with that PUSCH transmission. The fourth option can avoid the need for the UE to transmit HARQ ID along with its PUSCH transmissions. Compared to the second and third options, the fourth option can reduce scheduler flexibility for the eNB, but can also result in smaller uplink transmission overhead.

In the fourth option, the UE can receive a grant in subframe n. The grant can contain bits indicating a HARQ ID (x) and the grant can also contain bits indicating a window of subframes with window length (W) in which the UE can transmit PUSCH in response to the grant. Alternatively, window length information can be sent to the UE via higher layers instead of including bits in the grant, which can reduce grant payload overhead. The grant can also include bit(s) indicating whether the grant is for a new transmission or a retransmission, such as by using NDI bits. The grant can contain multiple NDI bits, where each NDI bit (p) can correspond to one subframe (subframe n+4+m) in the window of subframes. For example, if the window length W=4, the grant can contain 4 NDI bits with the first bit corresponding to PUSCH transmission in subframe n+4, the second bit corresponding to PUSCH transmission in subframe n+5, and so on. The uplink grant received by the UE can also contain bits indicating a MCS to be used for PUSCH transmission(s), bits indicating Resource Allocation (RA) within a subframe, such as the RBs to use for PUSCH transmission(s), and other bits indicating additional control information.

In response to the grant received in subframe n, the UE can make PUSCH transmissions in each subframe (subframe n+4+m) of the window of subframes for which LBT is successful. For subframes where the LBT is not successful, the UE can skip the PUSCH transmission and can wait for the eNB to send another grant requesting retransmission. The HARQ ID for each PUSCH transmission can be determined implicitly based on the subframe index of the subframe used for PUSCH transmission and the HARQ ID signaled in the grant. For example, if the grant in subframe n contains HARQ ID x, the UE's PUSCH transmission in subframe n+4+m can correspond to HARQ ID x" where x"=MOD (x+m, M_UL_HARQ), and where 0<m<W is the position of the subframe within the window of subframes. Since the HARQ ID can be implicitly linked to subframe index (e.g. n+4+m), there may be no need for the UE to transmit the HARQ ID along with its PUSCH transmission. That is, the eNB can implicitly determine the HARQ ID x" using the subframe index of the subframe in which PUSCH transmission is received from the UE (e.g. n+4+m), and the HARQ ID sent by the eNB in the grant (e.g., x) and the maximum number of uplink HARQ processes (M_UL_HARQ).

Additional embodiments can provide options for performing LBT for uplink transmissions by the UE. For a PUSCH transmission in a subframe, such as subframes n+4 or n+5, according to a first possible implementation, the UE can start performing LBT in the time duration corresponding to the last Orthogonal Frequency multiplexing/Discrete Fourier Transform (OFDM/DFT)-Spread OFDM(A) (DFT-SOFDM (A)) symbol in a previous subframe, such as in subframe n+3 or n+4 respectively. DFT-SOFDM(A) can also be referred to as Single Carrier FDM(A) (SC-FDM(A)). According to second possible implementation, the UE can start performing LBT in the time duration corresponding to the first DFT-SOFDM symbol in the same subframe, such as subframes n+4, n+5 respectively. According to a third possible implementation, for each burst of contiguous PUSCH transmissions in multiple subframes, such as subframes {n+4, n+5, . . . }, the UE can start performing LBT in the time duration corresponding to multiple ending OFDM/DFT-SOFDM symbols of a subframe immediately preceding the burst, such as in subframe n+3.

The eNB can send higher layer signaling to the UE based on which the UE can determine the minimum time duration for which it has to perform LBT before initiating a PUSCH transmission. The UE may also determine the maximum number of contiguous subframes in which it can transmit using higher layer signaling from the eNB. For example, the eNB can signal a 'q' value as specified in ETSI EN 301 893 specifications, such as in a clause describing channel access mechanism for load based equipment via higher layers. The UE can use the 'q' value to determine the minimum time duration for which it has to do LBT, such as using CCA and extended CCA mechanisms, before initiating the PUSCH transmission. The UE can also determine the maximum of contiguous subframes in which it can transmit PUSCH by deriving the maximum channel occupancy time using the 'q' value.

To support scheduling of multiple UEs transmissions in the same subframe, UEs may need to perform LBT operations in the same time window. The transmission in the previous subframe may originate from the eNB (downlink) or another UE(s) (uplink). The eNB may configure the UEs to start performing LBT assessments no earlier than T1 sec from the start of the guard period, such as a last OFDM/DFT-SOFDM symbol duration in the first implementation, and end LBT no later than T2 sec from the start of the PUSCH transmission if CCA is successful. T1 and T2 may include Tx/Rx switching time and expected worst case propagation delay. The eNB may also configure the same or substantially similar, such as within a few us, Timing Advance (TA) value for the UEs. The TA value may be a fixed value TA1, such as 624 Ts, in the specification.

If a UE using the second option above performs LBT using the second implementation, then the UE may need to perform LBT only once for each burst of contiguous PUSCH transmission subframes, instead of once for each PUSCH transmission subframe. For example, for the process illustrated in flowchart 401, while the UE may have to perform LBT and check if the carrier is free for PUSCH transmission corresponding to subframe where j=0, it can also skip the step of performing LBT and checking if carrier is free for other values of j. If devices operating on the unlicensed carrier have to follow a maximum occupancy time requirement, the eNB can be expected to signal a W value that is roughly equal to the maximum channel occupancy time requirement.

Figure 5:
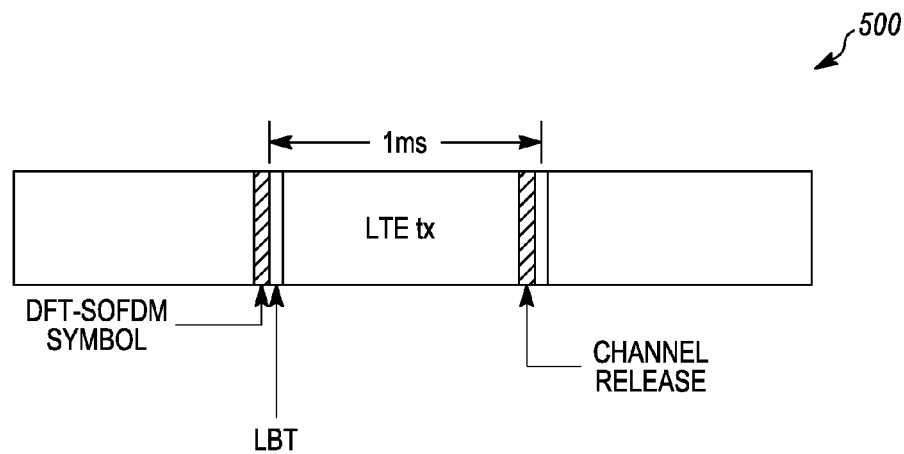
FIG. 5 is an example illustration of uplink transmission with listen before talk according to a possible embodiment.

FIG. 5 is an example illustration of an uplink transmission 500 with LBT according to a possible embodiment.

Typically for normal Cyclic Prefix (CP) there are 14 symbols in an LTE subframe (uplink or downlink), where each symbol can correspond to roughly 70 us duration. For a UE to perform uplink transmission in subframe n+4, the UE may have to perform LBT in the last DFT-SOFDM symbol of the previous subframe. If the previous subframe (n+3) was an uplink subframe, the UE would have to shorten its PUSCH transmissions in subframe n+3. The last symbol of an uplink subframe is typically reserved for PUSCH or SRS (Sounding Reference Signal) transmission from the UE to help eNB scheduling. Since LBT can disallow SRS transmissions in the last symbol, an alternate method can be useful to allow transmission of SRS from the UE to the eNB.

Figure 6:
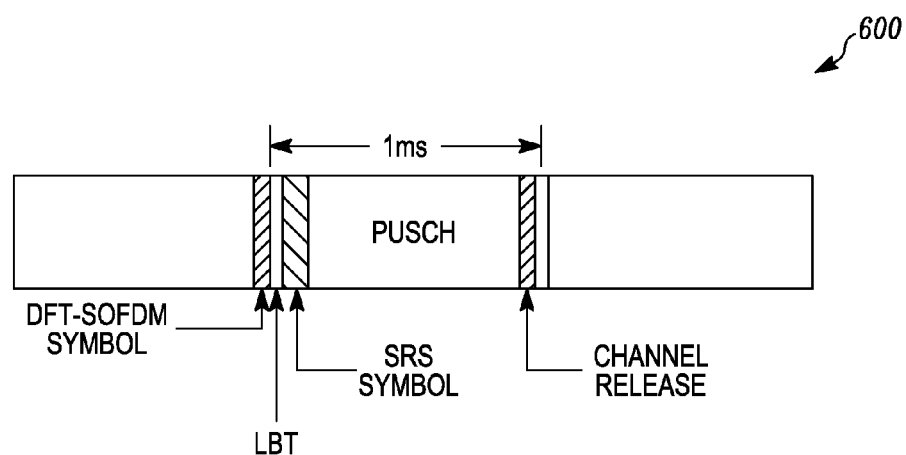
FIG. 6 is an example illustration of uplink transmission with listen before talk and sounding reference signal in first symbol of a subframe according to a possible embodiment.

FIG. 6 is an example illustration of uplink transmission 600 with LBT and SRS in a first DFT-SOFDM symbol of a subframe according to a possible embodiment. There may be three types of UE transmission on the uplink in unlicensed spectrum. For SRS transmission only, since a UEs LBT can disallow SRS transmissions in the last symbol of an uplink subframe, an alternate location for SRS transmission can be used. The UE can transmit SRS as soon as it senses a channel is free. Otherwise, the UE may have to transmit a reservation signal to keep the channel occupied until the time it is allowed to transmit the SRS. The UE can transmit the SRS in the first DFT-SOFDM symbol of an uplink subframe. This can allow a UE to do LBT immediately prior to the DFT-SOFDM symbol and transmit whenever the channel is free. To ensure that other UEs that are only performing PUSCH transmissions in that subframe are not affected, the eNB can signal to the other UEs to avoid PUSCH mapping to the first DFT-SOFDM symbol of the subframe.

For PUSCH transmission only, a shortened PUSCH can be used, where no PUSCH is transmitted in the symbol reserved for LBT. PUSCH may not be transmitted in the first DFT-SOFDM symbol reserved for SRS in a subframe. This can be indicated using a field in uplink grant to the UE scheduled for PUSCH transmission.

TABLE 1

One Bit Field Uplink Grant for PUSCH Transmission

| Field in Uplink grant | function | comment |
| --- | --- | --- |
| 0 | No SRS symbol in the subframe | Transmit PUSCH without rate-matching around $1^{st}$ symbol |
| 1 | First symbol in the subframe is reserved for SRS | Transmit PUSCH with rate-matching around $1^{st}$ symbol |

Alternatively, a two bit field can be used to explicitly indicate whether there is an SRS symbol in the subframe, whether the UE's PUSCH has to be rate-matched around the SRS symbol, and which configuration is used for transmitting the SRS in the first symbol.

TABLE 2

Two Bit Field Uplink Grant for PUSCH Transmission

| Field in Uplink grant | Function | |
| --- | --- | --- |
| 00 | No SRS symbol in the subframe | Transmit PUSCH without rate-matching around $1^{st}$ symbol |
| 01 | First symbol in the subframe is reserved for SRS | Transmit PUSCH with rate-matching around $1^{st}$ symbol |
| 10 | First symbol in the subframe is reserved for SRS, transmit SRS using first configuration | Transmit PUSCH with rate-matching around $1^{st}$ symbol, transmit SRS in the first symbol |
| 11 | First symbol in the subframe is reserved for SRS, transmit SRS using second configuration | Transmit PUSCH with rate-matching around $1^{st}$ symbol, transmit SRS in the first symbol |

The UE may lose the channel if it does LBT, such as the case where CCA performed by the UE is successful in the last symbol of the previous subframe, the UE does not have to transmit in the first OFDM symbol of the subframe, and the UE can attempt to transmit PUSCH in the remaining symbols of the subframe. Therefore, a UE that is configured to transmit PUSCH can always transmit SRS in the first symbol of the subframe, such as an unsolicited SRS just prior to transmitting PUSCH. The '01' or '1' value may then correspond to transmitting SRS using a third configuration, with SRS transmission in the first symbol.

For PUSCH and SRS transmission, a UE that is scheduled to transmit both PUSCH and SRS transmission may transmit SRS in the first symbol of the subframe, followed by PUSCH in the rest of the subframe. An explicit aperiodic SRS transmission indicator can be used to indicate to the UE whether, and in which resources, the SRS is transmitted. In another alternative, a UE may be configured such that it performs LBT in $13^{th}$ DFT-SOFDM symbol of subframe n+3, transmit SRS in $14^{th}$ DFT-SOFDM symbol, such as a last symbol, of subframe n+3, and then transmit PUSCH in subframe n+4 in first to $12^{th}$ DFT-SOFDM symbols, so it can again perform LBT in $13^{th}$ symbol of subframe n+4.

Figure 7:
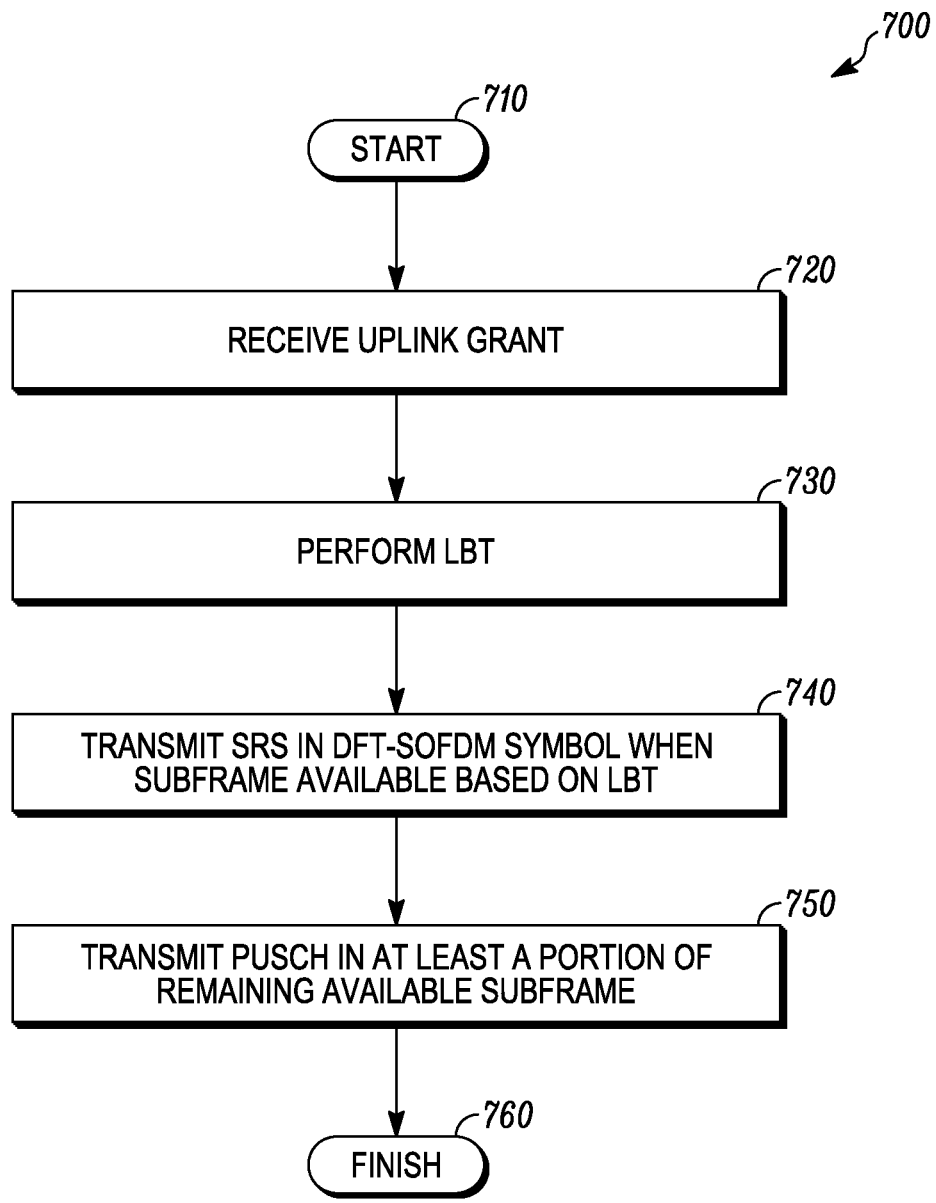
FIG. 7 is an example flowchart illustrating a user equipment procedure for transmitting a sounding reference signal according to a possible embodiment.

FIG. 7 is an example flowchart 700 illustrating a user equipment procedure for transmitting the SRS according to a possible embodiment. At 710, the flowchart 700 can begin. At 720, an uplink grant can be received. The uplink grant can include a field requesting the SRS transmission. The uplink grant can also include a field indicating a SRS resource in the DFT-SOFDM symbol for transmission of SRS. The uplink grant can additionally include a field that indicates there is no SRS in the subframe. The uplink grant can further include a field that indicates a configuration for transmitting the SRS. Alternately, or in addition to receiving the uplink grant, a signal can received that indicates avoiding PUSCH mapping in the first DFT-SOFDM symbol of a subframe. PUSCH mapping can be abstained in the first DFT-SOFDM symbol of the subframe in response to receiving the signal that indicates avoiding PUSCH mapping in the first DFT-SOFDM symbol of the subframe.

At 730, listen before talk can be performed to determine when a subframe is available for uplink transmission. The listen before talk procedure can be performed on an unlicensed carrier in response to receiving the uplink grant. At 740, a SRS can be transmitted in a first DFT-SOFDM symbol of the subframe when listen before talk indicates that the subframe is available. Transmission of SRS in the first DFT-SOFDM symbol can be performed in response to the field in the uplink grant requesting the SRS transmission. Transmission of the SRS in the first DFT-SOFDM symbol can also be performed in the SRS resource indicated by the field in the uplink grant. Transmission of the SRS in the first DFT-SOFDM symbol can additionally be performed even when the field that indicates there is no SRS in the subframe. Transmission of the SRS in the first DFT-SOFDM symbol can further be performed based on the field indicating the configuration for transmitting the SRS.

At 750, a PUSCH can be transmitted in at least a portion of a remaining part of the subframe. The portion of the remaining part of the subframe can exclude at least the last DFT-SOFDM symbol of the subframe. At 760, the flowchart 700 can end.

According to a possible embodiment, the eNB can include a HARQ ID, such as an UL HARQ ID, in the grant sent to the UE. While transmitting PUSCH in response to the grant, the UE can send the HARQ ID, such as the UL HARQ ID, along with the PUSCH transmission. For the second option discussed before, the UE can include both the HARQ ID and the HARQ-subID along with its PUSCH transmissions. The HARQ ID/HARQ subID can be transmitted by the UE using different approaches. For a first approach, a one-to-one mapping can be specified between UL HARQ ID and DMRS cyclic shift value. The UE can receive the UL HARQ ID in the UL grant and can use the corresponding DMRS cyclic shift value determined from the pre-specified mapping for transmitting or retransmitting PUSCH associated with that UL HARQ ID. For example, if the UL grant contains UL HARQ ID (x), the UE can transmit the corresponding PUSCH using DMRS cyclic shift x.

For a second approach, the UE can multiplex bits indicating HARQ ID, and HARQ subID if needed, within its PUSCH transmission. The uplink HARQ ID, and HARQ subID if needed, can be multiplexed within PUSCH using different methods. One method for multiplexing the uplink HARQ ID, and HARQ subID if needed, can use Uplink Control Information (UCI) multiplexing type 1. In this case, the uplink HARQ ID, such as a HARQ ID having <3 bits, can be encoded using a block code to a particular code and the number of resource elements for transmission of the uplink HARQ ID can be determined, based on the uplink data MCS. The encoded uplink HARQ ID can mapped to a subset of resource elements from the set of resource elements assigned for PUSCH transmission. This subset can be determined based on a predetermined rule, such as in a set of or portion of DFT-SOFDM symbols in the subframe, such as OFDM symbols 1, 2, or in a set of resources, such as lowest indexed modulation symbols corresponding to the resource assignment. A similar approach can be used for HARQ subID, such as with 2 additional bits, with possibly joint encoding with the HARQ ID.

Another method for multiplexing the uplink HARQ ID, and HARQ subID if needed, can multiplex the UL HARQ ID with uplink data using various additional methods. One method for multiplexing the UL HARQ ID with uplink data can use rate-matching. In this case, the encoded uplink HARQ ID can be mapped to a subset of modulation symbols and the encoded data can be mapped to the remaining subset of modulation symbols assigned for PUSCH transmission. This can be a useful mechanism if the eNB is aware that the encoded uplink HARQ ID is always sent by the UE. A similar approach can be used for a HARQ subID. Another method for multiplexing the UL HARQ ID with uplink data can use puncturing. In this case, the encoded data can be mapped to the all of the modulation symbols assigned for PUSCH transmission and the uplink HARQ ID can be mapped to a subset of modulation symbols, overwriting any encoded data. This can be a useful mechanism if the eNB is not always sure if the encoded uplink HARQ ID is always sent by the UE. Thus, in cases where the encoded uplink HARQ ID is not transmitted, the UE can use the subset of modulation symbols for PUSCH to improve the data performance. A similar approach can be used for a HARQ subID.

In another method for multiplexing the uplink HARQ ID, and HARQ subID if needed, for UL-MIMO, the uplink HARQ ID information may be multiplexed with data on both UL-SCH transport blocks and possibly on the same modulation symbol resources. Other methods for multiplexing the uplink HARQ ID, and HARQ subID if needed, can include other types of UCI multiplexing on PUSCH, such as methods used in LTE for multiplexing CQI (Channel Quality Indicator) or PMI (Precoder Matrix Indicator) or RI (Rank Indicator) or HARQ-ACK (Hybrid ARQ Acknowledgments), and other methods.

The HARQ ID may be encoded in multiple ways. For one way of encoding a HARQ ID, a CRC may be attached and the CRC-encoded HARQ ID may be coded using a block code such as Reed-Muller code or convolutional code. This can allow an eNB to reliably detect the HARQ-ID. A similar approach can be used for a HARQ subID. The HARQ ID can also be directly encoded using a block code such as Reed-Muller code or convolutional code. Since there is no CRC, there may be no reliable error detection, but this can enable a lower coding rate, which can result in improved performance. A similar approach can be used for a HARQ subID. For 1 or 2 bit HARQ ID/sub ID, the HARQ ID/sub ID bits can be mapped to a Binary Phase Shift Keying (BPSK)/Quadrature Phase Shift Keying (QPSK) symbol, and the BPSK/QPSK symbol can be used to modulate one of the demodulation reference signals in the subframe.

The UE can indicate UL HARQ ID using a first method (for example, using the first approach described above) and UL HARQ subID using a second method (for example, using the second approach described above).

Figure 8:
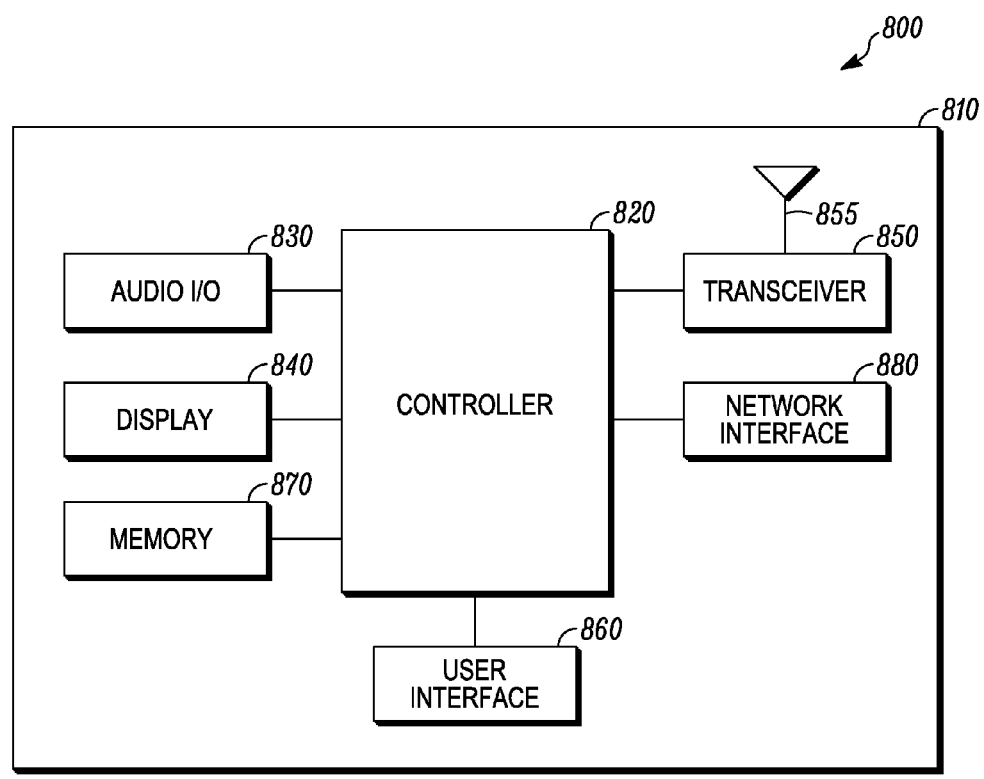
FIG. 8 is an example block diagram of an apparatus according to a possible embodiment.

FIG. 8 is an example block diagram of an apparatus 800, such as the UE 110 or the UE 112, according to a possible embodiment. The apparatus 800 can include a housing 810, a controller 820 within the housing 810, audio input and output circuitry 830 coupled to the controller 820, a display 840 coupled to the controller 820, a transceiver 850 coupled to the controller 820, an antenna 855 coupled to the transceiver 850, a user interface 860 coupled to the controller 820, a memory 870 coupled to the controller 820, and a network interface 880 coupled to the controller 820. The apparatus 800 can perform the methods described in all the embodiments.

The display 840 can be a viewfinder, a liquid crystal display (LCD), a light emitting diode (LED) display, a plasma display, a projection display, a touch screen, or any other device that displays information. The transceiver 850 can include a transmitter and/or a receiver. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a universal serial bus port, an Ethernet port, an infrared transmitter/receiver, a USB port, an IEEE 1398 port, a WLAN transceiver, or any other interface that can connect an apparatus to a network or computer and that can transmit and receive data communication signals. The memory 870 can include a random access memory, a read only memory, an optical memory, a flash memory, a removable memory, a hard drive, a cache, or any other memory that can be coupled to a wireless communication device.

The apparatus 800 or the controller 820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 870 or elsewhere on the apparatus 800. The apparatus 800 or the controller 820 may also use hardware to implement disclosed operations. For example, the controller 820 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating an electronic device and implementing the disclosed embodiments.

In operation according to a possible embodiment, the transceiver 850 can receive a configuration indicating a window length from a higher layer, where the higher layer is higher than a physical layer. The transceiver 850 can also receive a grant in a subframe, where the grant can be for transmitting a PUSCH on a serving cell operating on an unlicensed carrier. The grant for transmitting the PUSCH can include a HARQ ID.

The controller 820 can determine a set of subframes for possible transmission of the PUSCH based on the window length and the subframe in which the grant is received. The set of subframes can include a number of subframes, where the number of subframes in the set of subframes can be equal to the window length. The controller 820 can also perform LBT on the unlicensed carrier to determine an earliest unoccupied subframe in the set of subframes.

The transceiver 850 can transmit the PUSCH in the earliest unoccupied subframe in response to receiving the grant. The transceiver 850 can transmit the PUSCH in the earliest unoccupied subframe if the unoccupied subframe is unoccupied and if the unoccupied subframe is within the window length. The transceiver 850 can indicate the HARQ ID along with the PUSCH transmission. According to a possible implementation, the controller 820 can determine a demodulation reference signal cyclic shift value based on the HARQ ID and the transceiver 850 can transmit a demodulation reference signal using the determined cyclic shift value, along with the PUSCH transmission. According to another possible implementation, the transceiver 850 can indicate the HARQ ID along with the PUSCH transmission by multiplexing bits indicating the HARQ ID into a portion of resources assigned for the PUSCH transmission.

The transceiver 850 can also receive a second grant in a second subframe, where the second grant can be for transmitting a second PUSCH on the serving cell operating on the unlicensed carrier. The controller 820 can determine a second set of subframes for possible transmission of the second PUSCH based on the window length and the second subframe in which the second grant is received. The determined earliest unoccupied subframe can be a subframe in the second set of subframes. The controller 820 can then prioritize one of multiple PUSCH transmissions based on the order in which each corresponding PUSCH grant is received. The transceiver 850 can then transmit the prioritized PUSCH transmission in the earliest unoccupied subframe.

The controller 820 can perform LBT a first subframe in the set of subframes, can determine the first subframe in the set of subframes is occupied, and can perform LBT on subsequent subframes in the set of subframes to determine an earliest unoccupied subframe in the set of subframes. The controller 820 can determine none of the subframes in the set of subframes are free for PUSCH transmission based on performing LBT, and can skip transmitting PUSCH for the grant if none of the subframes in the set of subframes are free for PUSCH transmission.

In operation according to another possible embodiment, the transceiver 850 can receive, in a subframe, a grant for transmitting PUSCH on a serving cell operating on an unlicensed spectrum. The grant for transmitting PUSCH can include a HARQ ID. The controller 820 can determine a set of subframes for possible transmission of the PUSCH and perform LBT on the unlicensed carrier to determine an earliest unoccupied subframe in the set of subframes.

The transceiver 850 can transmit a PUSCH in multiple subframes within the set of subframes on the unlicensed carrier, starting with the earliest unoccupied subframe, in response to receiving the grant. The transceiver 850 can include the HARQ ID in each PUSCH transmission in the multiple subframes. The transceiver 850 can also include a HARQ subID along with each PUSCH transmission in the multiple subframes. The HARQ subID can be for a particular PUSCH transmission in the multiple subframes. The HARQ subID can be set to 0 for the first PUSCH transmission, can be set to 1 for the second PUSCH transmission, and can be incremented for each subsequent PUSCH transmission.

The controller 820 can determine a new HARQ ID for each PUSCH transmission made in response to the grant. The new HARQ ID can be determined based on the received HARQ ID and an order of the PUSCH transmission within the PUSCH transmission in the multiple subframes. The transceiver 850 can transmit each new HARQ ID along with each PUSCH transmission.

The new HARQ ID can also be determined based on the received HARQ ID and a subframe index of the subframe where each PUSCH transmission is made. The transceiver 850 can then receive a second grant requesting a retransmission. The second grant can include the new HARQ ID that was previously transmitted. The transceiver 850 can then transmit PUSCH in response to the second grant to retransmit the data that is associated with the same new HARQ ID.

In operation according to another possible embodiment, the transceiver 850 can receive an uplink grant. The uplink grant can include a field requesting the SRS transmission. The uplink grant can also include a field indicating a SRS resource in the DFT-SOFDM symbol for transmission of SRS. The uplink grant can additionally include a field that indicates there is no SRS in the subframe. The uplink grant can further include a field that indicates a configuration for transmitting the SRS.

The controller 820 can perform LBT to determine when a subframe is available for uplink transmission. For example, the controller 820 can perform the LBT in response to the transceiver receiving the uplink grant. The controller 820 can perform LBT on an unlicensed carrier to determine when a subframe is available for uplink transmission.

The transceiver 850 can transmit a SRS in a first DFT-SOFDM symbol of the subframe when LBT indicates that the subframe is available. The transmission of the SRS in the first DFT-SOFDM symbol can be performed in response to the field in the uplink grant requesting the SRS transmission. The transmission of the SRS in the first DFT-SOFDM symbol can also be performed even when the field that indicates there is no SRS in the subframe. The transmission of the SRS in the first DFT-SOFDM symbol can additionally be performed in the SRS resource indicated by the field in the uplink grant. The transmission of the SRS in the first DFT-SOFDM symbol can further be performed based on the field indicating the configuration for transmitting the SRS. The transceiver 850 can transmit PUSCH in at least a portion of a remaining part of the subframe. The portion of the remaining part of the subframe can exclude at least the last DFT-SOFDM symbol of the subframe.

The transceiver 850 can also receive a signal that indicates avoiding PUSCH mapping in the first DFT-SOFDM symbol of a subframe. The controller 820 can then abstain from PUSCH mapping in the first DFT-SOFDM symbol of the subframe in response to receiving the signal that indicates avoiding PUSCH mapping in the first DFT-SOFDM symbol of the subframe.

Figure 9:
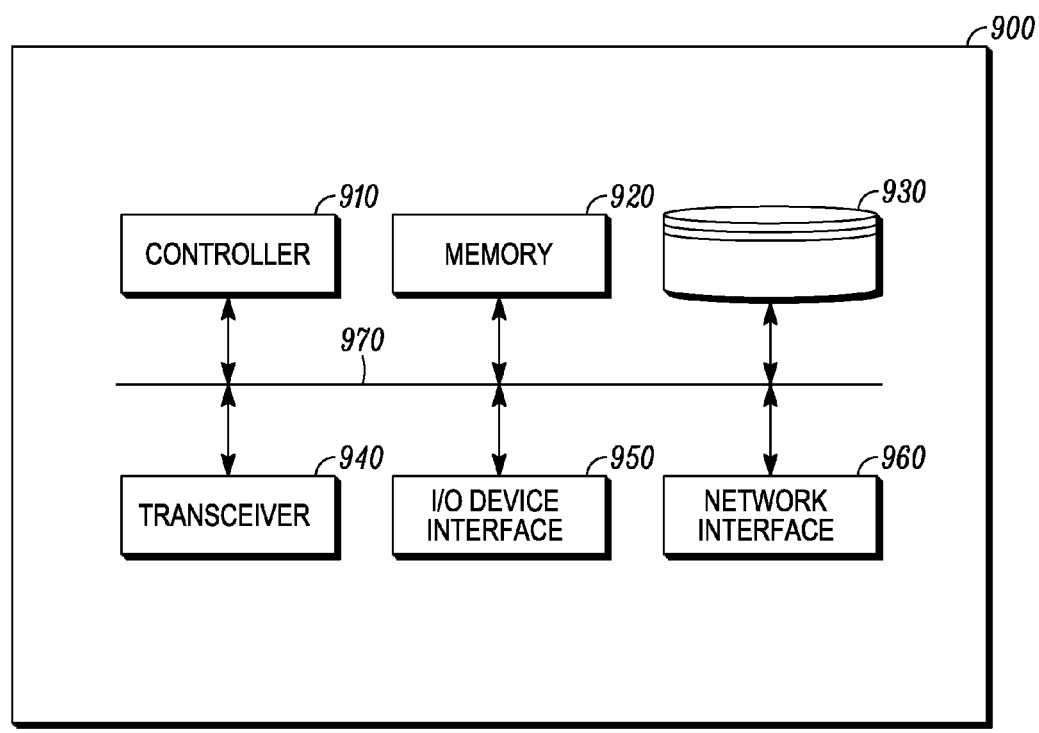
FIG. 9 is an example block diagram of a base station according to a possible embodiment.

FIG. 9 is an example block diagram of a base station 900, such as the eNB 120, according to a possible embodiment. The base station 900 may include a controller 910, a memory 920, a database interface 930, a transceiver 940, Input/Output (I/O) device interface 950, a network interface 960, and a bus 970. The base station 900 can implement any operating system, such as Microsoft Windows®, UNIX, or LINUX, for example. Base station operation software may be written in any programming language, such as C, C++, Java or Visual Basic, for example. The base station software can run on an application framework, such as, for example, a Java® server, a .NET® framework, or any other application framework.

The transceiver 940 can create a data connection with the UE 110. The controller 910 can be any programmable processor. Disclosed embodiments can also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 910 can be any controller or processor device or devices capable of operating a base station and implementing the disclosed embodiments.

The memory 920 can include volatile and nonvolatile data storage, including one or more electrical, magnetic, or optical memories, such as a Random Access Memory (RAM), cache, hard drive, or other memory device. The memory 920 can have a cache to speed access to specific data. The memory 920 can also be connected to a Compact Disc-Read Only Memory (CD-ROM), Digital Video Disc-Read Only memory (DVD-ROM), DVD read write input, tape drive, thumb drive, or other removable memory device that allows media content to be directly uploaded into a system. Data can be stored in the memory 920 or in a separate database. For example, the database interface 930 can be used by the controller 910 to access the database. The database can contain any formatting data to connect the terminal 110 to the network 130.

The I/O device interface 950 can be connected to one or more input and output devices that may include a keyboard, a mouse, a touch screen, a monitor, a microphone, a voice-recognition device, a speaker, a printer, a disk drive, or any other device or combination of devices that accept input and/or provide output. The I/O device interface 950 can receive a data task or connection criteria from a network administrator. The network connection interface 960 can be connected to a communication device, modem, network interface card, a transceiver, or any other device capable of transmitting and receiving signals to and from the network 130. The components of the base station 900 can be connected via the bus 970, may be linked wirelessly, or may be otherwise connected.

Although not required, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

Embodiments can provide for a method including UE being configured by higher layers with a window length (W) parameter, receiving a grant for transmitting PUSCH on a serving cell operating in unlicensed spectrum, determining a set of subframes for possible transmission of PUSCH based on W and the subframe in which the grant is received, performing listen before talk on the unlicensed carrier to determine the earliest unoccupied subframe in the set of subframes, and transmitting PUSCH in that earliest subframe in response to the received grant. The method can include receiving a HARQ ID (x) in the grant and including the received HARQ ID (x) along with the PUSCH transmission. If multiple PUSCH transmissions due to multiple received grants are possible in the same subframe, the method can include prioritizing one of the multiple PUSCH transmissions based on the order in which the grants corresponding to the transmissions are received, and transmitting the prioritized PUSCH transmission in the earliest subframe.

Embodiments can provide for a method including UE receiving a grant for transmitting PUSCH on a serving cell operating in unlicensed spectrum, determining a set of subframes for possible transmission of PUSCH, performing listen before talk on the unlicensed carrier to determine the earliest unoccupied subframe in the set of subframes, and making multiple PUSCH transmissions in multiple subframes within the set of subframes, starting with the earliest unoccupied subframe, in response to the received grant. The method can include determining the set of subframes for possible transmission of PUSCH using the subframe index of the subframe in which the grant is received and a window length parameter including a window length (W) that is either received in the grant or configured via higher layers. The method can include receiving a HARQ ID (x) in the grant and including the received HARQ ID (x) in each of the multiple PUSCH transmissions, in addition to the HARQ ID (x), including a HARQ subID (y) along with each of the multiple PUSCH transmissions, where the HARQ subID can be set to 0 (y=0) for the first PUSCH transmission, can be set to 1 (y=1) for the second PUSCH transmission, etc. The method can include receiving a second grant requesting a retransmission, wherein the second grant can include a HARQ ID and HARQ subID that was previously transmitted by the UE, and transmitting PUSCH in response to the second grant to retransmit data that is associated with the same HARQ ID and HARQ subID. The method can include receiving a HARQ ID (x) in the grant, determining a new HARQ ID (x') for each PUSCH transmission made in response to the grant, and transmitting the new HARQ ID (x') along with each PUSCH transmission, where the new HARQ ID (x') can be determined based on the received HARQ ID (x) and the order of the PUSCH transmission within the multiple PUSCH transmissions. The method can include receiving a second grant requesting a retransmission, where the second grant can include a HARQ ID (x') that was previously transmitted by the UE, and transmitting PUSCH in response to the second grant to retransmit the data that is associated with the same HARQ ID (x'). The method can include receiving a HARQ ID (x) in the grant, determining a new HARQ ID (x") for each PUSCH transmission made in response to the grant, where the new HARQ ID (x") can be determined based on the received HARQ ID (x) and the subframe index of the subframe where each PUSCH transmission is made, receiving a second grant requesting a retransmission, where the second grant can include a HARQ ID (x") that was previously transmitted by the UE, and transmitting PUSCH in response to the second grant to retransmit the data that is associated with the same HARQ ID (x"). The method can include receiving multiple New Data Indicators (NDI's) within the grant, where each NDI value can be associated with each subframe within the determined set of subframes for possible transmission of PUSCH, and transmitting either new data or retransmission in that subframe according to the NDI value.

Embodiments can provide for a UE determining a minimum time for performing clear channel assessment before determining that a carrier is unoccupied, a maximum channel occupancy time for contiguous transmission on the carrier, and/or a starting position of a symbol within a subframe for initiating clear channel assessment; for performing LBT, based on signaling received from eNB.

Embodiments can also provide for a method including a UE performing LBT, transmitting SRS in the first OFDM symbol of an uplink subframe if LBT passes, and transmitting PUSCH in at least a portion of the remaining part of the subframe.

The methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

The invention claimed is:

1. A method in a user equipment, the method comprising:
   receiving a configuration indicating a window length from a higher layer, where the higher layer is higher than a physical layer;
   receiving a grant in a subframe, the grant for transmitting a physical uplink shared channel on a serving cell operating on an unlicensed carrier;

determining a set of subframes for possible transmission of the physical uplink shared channel based on the window length and the subframe in which the grant is received;

performing listen before talk on the unlicensed carrier to determine an earliest unoccupied subframe in the set of subframes; and transmitting the physical uplink shared channel in the earliest unoccupied subframe in response to receiving the grant, wherein the grant for transmitting the physical uplink shared channel includes a hybrid automatic retransmission request identifier, and wherein the method further comprises indicating the hybrid automatic retransmission request identifier along with the physical uplink shared channel transmission.

2. The method according to claim 1, wherein transmitting comprises transmitting the physical uplink shared channel in the earliest unoccupied subframe when the subframe is unoccupied and when the subframe is within the window length.

3. The method according to claim 1,
wherein indicating the hybrid automatic retransmission request identifier along with the physical uplink shared channel transmission comprises:
determining a demodulation reference signal cyclic shift value based on the hybrid automatic retransmission request identifier; and
transmitting a demodulation reference signal using the determined cyclic shift value, along with the physical uplink shared channel transmission.

4. The method according to claim 1,
wherein indicating the hybrid automatic retransmission request identifier along with the physical uplink shared channel transmission comprises multiplexing bits indicating the hybrid automatic retransmission request identifier into a portion of resources assigned for the physical uplink shared channel transmission.

5. The method according to claim 1, further comprising:
receiving a second grant in a second subframe, where the second grant is for transmitting a second physical uplink shared channel on the serving cell operating on the unlicensed carrier;
determining a second set of subframes for possible transmission of the second physical uplink shared channel based on the window length and the second subframe in which the second grant is received, where the determined earliest unoccupied subframe is a subframe in the second set of subframes; and
prioritizing one of multiple physical uplink shared channel transmissions based on the order in which each corresponding physical uplink shared channel grant is received when the earliest unoccupied subframe corresponding to the first grant and second grant is the same,
wherein transmitting comprises transmitting the prioritized physical uplink shared channel transmission in the earliest unoccupied subframe.

6. The method according to claim 1, wherein performing listen before talk comprises:
performing listen before talk on a first resource associated with a first subframe in the set of subframes;
determining that the first subframe in the set of subframes is occupied; and performing listen before talk on resources associated with subsequent subframes in the set of subframes to determine an earliest unoccupied subframe in the set of subframes.

7. The method according to claim 6, further comprising:
determining none of the subframes in the set of subframes are unoccupied for physical uplink shared channel transmission based on performing listen before talk; and
skipping transmitting physical uplink shared channel for the grant when none of the subframes in the set of subframes are unoccupied for physical uplink shared channel transmission.

8. The method according to claim 1, wherein the set of subframes includes a number of subframes, where the number of subframes in the set of subframes is equal to the window length.

9. The method according to claim 1, wherein the configuration indicating a window length comprises at least one of an explicit window length indication and a pointer to a window length from which window length is determined using a look-up table.

10. An apparatus comprising:
a transceiver configured to receive a configuration indicating a window length from a higher layer, where the higher layer is higher than a physical layer, and configured to receive a grant in a subframe, the grant for transmitting a physical uplink shared channel on a serving cell operating on an unlicensed carrier; and
a controller coupled to the transceiver, the controller configured to determine a set of subframes for possible transmission of the physical uplink shared channel based on the window length and the subframe in which the grant is received, and configured to perform listen before talk on the unlicensed carrier to determine an earliest unoccupied subframe in the set of subframes,
wherein the transceiver is configured to transmit the physical uplink shared channel in the earliest unoccupied subframe in response to receiving the grant,
wherein the grant for transmitting the physical uplink shared channel includes a hybrid automatic retransmission request identifier, and
wherein the transceiver is configured to indicate the hybrid automatic retransmission request identifier along with the physical uplink shared channel transmission.

11. The apparatus according to claim 10, wherein the transceiver is configured to transmit the physical uplink shared channel in the earliest unoccupied subframe when the subframe is unoccupied and when the subframe is within the window length.

12. The apparatus according to claim 11,
wherein the controller is configured to determine a demodulation reference signal cyclic shift value based on the hybrid automatic retransmission request identifier, and
wherein transceiver is configured to transmit a demodulation reference signal using the determined cyclic shift value, along with the physical uplink shared channel transmission.

13. The apparatus according to claim 11,
wherein the transceiver is configured to indicate the hybrid automatic retransmission request identifier along with the physical uplink shared channel transmission by multiplexing bits indicating the hybrid automatic retransmission request identifier into a portion of resources assigned for the physical uplink shared channel transmission.

14. The apparatus according to claim 10,
wherein the transceiver is configured to receive a second grant in a second subframe, where the second grant is for transmitting a second physical uplink shared channel on the serving cell operating on the unlicensed carrier,
wherein the controller is configured to determine a second set of subframes for possible transmission of the second physical uplink shared channel based on the window length and the second subframe in which the second grant is received, where the determined earliest unoccupied subframe is a subframe in the second set of subframes, and is configured to prioritize one of multiple physical uplink shared channel transmissions based on the order in which each corresponding physical uplink shared channel grant is received when the earliest unoccupied subframe corresponding to the first grant and second grant is the same, and
wherein the transceiver is configured to transmit by transmitting the prioritized physical uplink shared channel transmission in the earliest unoccupied subframe.

15. The apparatus according to claim 10, wherein the controller is configured to perform listen before talk by performing listen before talk on a first resource associated with a first subframe in the set of subframes, determining the first subframe in the set of subframes is occupied, and performing listen before talk on resources associated with subsequent subframes in the set of subframes to determine an earliest unoccupied subframe in the set of subframes.

16. The apparatus according to claim 15, wherein the controller is configured to determine none of the subframes in the set of subframes are unoccupied for physical uplink shared channel transmission based on performing listen before talk, and configured to skip transmitting physical uplink shared channel for the grant when none of the subframes in the set of subframes are unoccupied for physical uplink shared channel transmission.

17. The apparatus according to claim 10, wherein the set of subframes includes a number of subframes, where the number of subframes in the set of subframes is equal to the window length.

18. A method in a user equipment, the method comprising:
receiving a configuration indicating a window length from a higher layer in a long term evolution system, where the higher layer is higher than a physical layer;
receiving a grant in a subframe, the grant for transmitting a physical uplink shared channel on a serving cell operating on an unlicensed carrier in the long term evolution system;
determining a set of subframes for possible transmission of the physical uplink shared channel based on the window length and the subframe in which the grant is received, where the set of subframes includes a number of subframes, where the number of subframes in the set of subframes is equal to the window length;
performing listen before talk on the unlicensed carrier to determine an earliest unoccupied subframe in the set of subframes; and
transmitting the physical uplink shared channel in the earliest unoccupied subframe when the unoccupied subframe is unoccupied and when the unoccupied subframe is within the window length,
wherein the grant for transmitting the physical uplink shared channel includes a hybrid automatic retransmission request identifier, and
wherein the method further comprises indicating the hybrid automatic retransmission request identifier along with the physical uplink shared channel transmission.

* * * * *